US012567739B2

(12) United States Patent
Ikeda

(10) Patent No.: US 12,567,739 B2
(45) Date of Patent: Mar. 3, 2026

(54) ELECTROSTATIC PROTECTION CIRCUIT

(71) Applicant: SEIKO EPSON CORPORATION,
Tokyo (JP)

(72) Inventor: Masuhide Ikeda, Matsumoto (JP)

(73) Assignee: SEIKO EPSON CORPORATION,
Tokyo (JP)

( * ) Notice: Subject to any disclaimer, the term of this
patent is extended or adjusted under 35
U.S.C. 154(b) by 308 days.

(21) Appl. No.: 17/988,173

(22) Filed: Nov. 16, 2022

(65) Prior Publication Data

US 2023/0155374 A1     May 18, 2023

(30) Foreign Application Priority Data

Nov. 18, 2021     (JP) ................................. 2021-187665

(51) Int. Cl.
H02H 9/04         (2006.01)
(52) U.S. Cl.
CPC ............ *H02H 9/046* (2013.01); *H02H 9/045*
(2013.01)
(58) Field of Classification Search
CPC ..... H02H 9/045; H02H 9/046; H01L 27/0248
See application file for complete search history.

(56) References Cited

U.S. PATENT DOCUMENTS 5,654,862 A      8/1997  Worley et al.
2004/0141269 A1* 7/2004  Kitagawa ............ H01L 27/0251
                                             361/56

2013/0163128 A1*  6/2013  Van Wijmeersch ... H02H 9/046
                                                          361/56
2016/0149403 A1*  5/2016  Ikeda ..................... H02H 9/041
                                                          361/56
2017/0346281 A1* 11/2017  Tanaka ................... H02H 9/046

FOREIGN PATENT DOCUMENTS

EP          0 803 955 A2   10/1997
JP          8-306873 A     11/1996
JP          10-50494 A      2/1998
JP          2019-36647 A    3/2019

* cited by examiner

*Primary Examiner* — Alex Torres-Rivera
(74) *Attorney, Agent, or Firm* — Rankin, Hill & Clark
LLP

(57) ABSTRACT

A circuit device includes: a first terminal; a second terminal;
a first thyristor circuit whose one end is coupled to the first
terminal; a second thyristor circuit whose one end is coupled
to the second terminal; and a voltage setting circuit that is
shared by the first thyristor circuit and the second thyristor
circuit and through which a current from the first thyristor
circuit when the first thyristor circuit is turned on and a
current from the second thyristor circuit when the second
thyristor circuit is turned on flow. The voltage setting circuit
sets a voltage at other end of the first thyristor circuit to a
first voltage when the first thyristor circuit is turned on, and
sets a voltage at other end of the second thyristor circuit to
a second voltage when the second thyristor circuit is turned
on.

15 Claims, 23 Drawing Sheets

TS    VSS

ELECTROSTATIC PROTECTION CIRCUIT

The present application is based on, and claims priority from JP Application Serial Number 2021-187665, filed Nov. 18, 2021, the disclosure of which is hereby incorporated by reference herein in its entirety.

BACKGROUND

1. Technical Field

The present disclosure relates to a circuit device.

2. Related Art

In a circuit device, an electrostatic protection circuit is provided in order to prevent occurrence of a problem caused by application of static electricity charged to a human body, a transport device, or the like to an internal circuit. As a technique for the electrostatic protection circuit in the related art, for example, a circuit disclosed in JP-A-2019-036647 is proposed. The electrostatic protection circuit disclosed in JP-A-2019-036647 includes a switch circuit and a clamping circuit coupled in series between a first node and a second node. The switch circuit includes a thyristor and a resistor, and the clamping circuit includes a plurality of diodes coupled in series. The clamping circuit is coupled in series to the thyristor so that the thyristor does not remain on even after an electrostatic protection operation.

However, when the number of terminals provided with the electrostatic protection circuit is large, an area occupied by the clamping circuit in the circuit device increases, which may lead to an increase in scale of the circuit device.

SUMMARY

An aspect of the present disclosure relates to a circuit device including: a first terminal; a second terminal; a first thyristor circuit whose one end is coupled to the first terminal; a second thyristor circuit whose one end is coupled to the second terminal; and a voltage setting circuit that is shared by the first thyristor circuit and the second thyristor circuit and through which a current from the first thyristor circuit when the first thyristor circuit is turned on and a current from the second thyristor circuit when the second thyristor circuit is turned on flow. The voltage setting circuit sets a voltage at another end of the first thyristor circuit to a first voltage when the first thyristor circuit is turned on, and sets a voltage at another end of the second thyristor circuit to a second voltage when the second thyristor circuit is turned on.

BRIEF DESCRIPTION OF THE DRAWINGS

FIG. 1 is a diagram of a configuration and an operation of a thyristor circuit.

FIG. 3 is a first configuration example of a circuit device according to the present embodiment.

FIG. 4 is a diagram illustrating a discharge path in the first configuration example.

FIG. 7 is a diagram illustrating a discharge path in the second configuration example.

FIG. 10 is a fourth configuration example of the circuit device according to the present embodiment.

FIG. 11 is a diagram illustrating a discharge path in the fourth configuration example.

FIG. 12 is a fifth configuration example of the circuit device according to the present embodiment.

FIG. 13 is a sixth configuration example of the circuit device according to the present embodiment.

FIG. 14 is a seventh configuration example of the circuit device according to the present embodiment.

FIG. 20 is an eleventh configuration example of the circuit device according to the present embodiment.

FIG. 21 is a diagram illustrating a discharge path in the eleventh configuration example.

FIG. 22 is a twelfth configuration example of the circuit device according to the present embodiment.

DESCRIPTION OF EXEMPLARY EMBODIMENTS

Hereinafter, the present embodiment will be described. The present embodiment to be described below does not unduly limit contents described in the claims. All configurations described in the present embodiment are not necessarily essential constituent elements.

1. First Configuration Example

Figure 1:
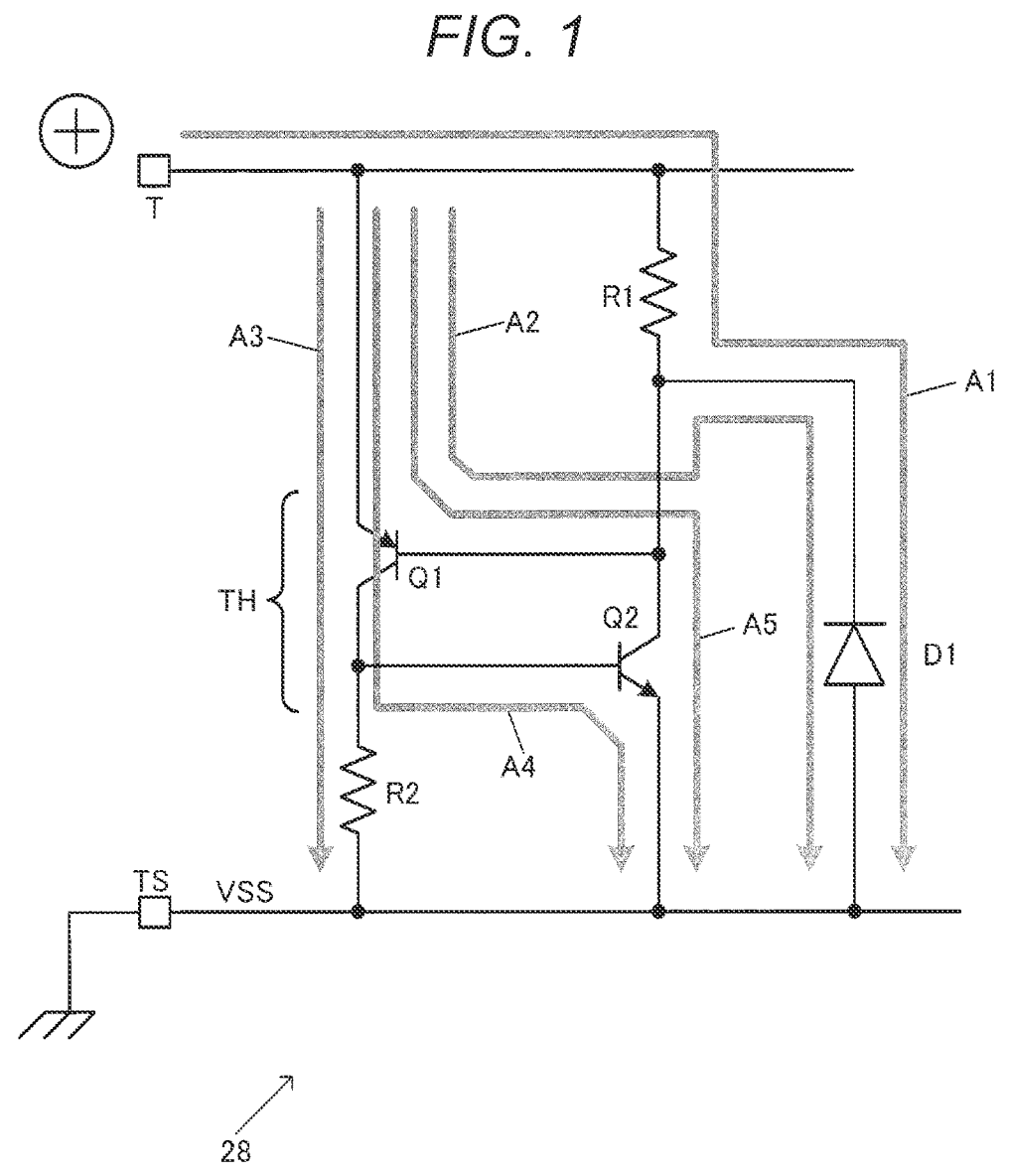

First, a configuration and an operation of a thyristor circuit 28 used as an electrostatic protection circuit will be described with reference to FIG. 1. As shown in FIG. 1, the thyristor circuit 28 includes a thyristor TH, resistors R1, R2, and a diode D1. The thyristor TH includes a pnp bipolar transistor Q1 and an npn bipolar transistor Q2. An emitter of the bipolar transistor Q1 is coupled to a terminal T which is an input terminal, and a base and a collector of the bipolar transistor Q1 are coupled to a collector and a base of the bipolar transistor Q2, respectively. An emitter of the bipolar transistor Q2 is coupled to a power supply terminal TS of VSS which is a low potential-side power supply. The resistor R1 has one end coupled to the terminal T and the other end coupled to the collector of the bipolar transistor Q2, and the resistor R2 has one end coupled to the collector of the bipolar transistor Q1 and the other end coupled to the power supply terminal TS of VSS. The diode D1 constituting a trigger circuit is provided between the other end of the resistor R1 and the power supply terminal TS of VSS.

Specifically, the diode D1 has a cathode coupled to the other end of the resistor R1 and an anode coupled to the power supply terminal TS. The diode D1 is a Zener diode.

In the thyristor circuit 28, when the Zener diode D1 breaks down and a current flows as indicated by A1 in FIG. 1, a base current of the pnp bipolar transistor Q1 flows as indicated by A2, the bipolar transistor Q1 is turned on, and a current as indicated by A3 flows. Accordingly, a base current of the npn bipolar transistor Q2 flows as indicated by A4, the bipolar transistor Q2 is turned on and a current flows as indicated by A5, and the thyristor TH is turned on. In this manner, when the thyristor TH is turned on, the thyristor circuit 28 operates as an electrostatic protection circuit. That is, a surge current due to static electricity applied to the terminal T flows through the power supply terminal TS of VSS, so that an internal circuit is protected from the static electricity.

Here, in the configuration of FIG. 1, for example, in a system in which an external power supply is directly coupled to the terminal T, when the thyristor TH is turned on due to noise or the like, there is a problem in that an on-state of the thyristor TH is maintained and a current continues to flow through the thyristor TH.

Figure 2:
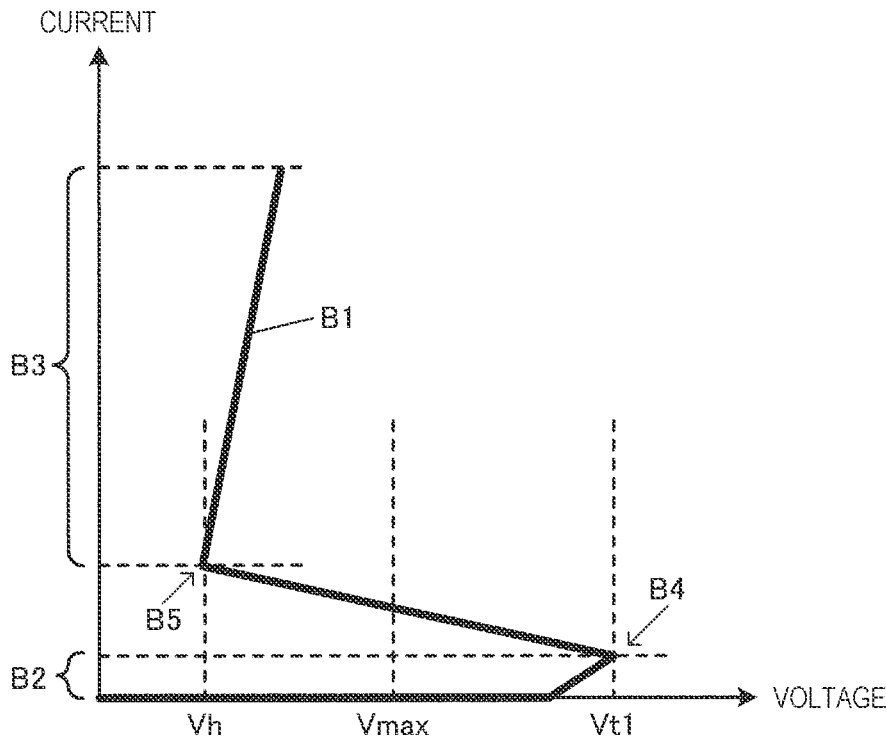
FIG. 2 is a voltage-current characteristic diagram illustrating the operation of the thyristor circuit.

This point will be described with reference to a voltage-current characteristic diagram of FIG. 2. B1 in FIG. 2 is a voltage-current characteristic of the current flowing through the thyristor TH. B2 is a range in which the thyristor TH is turned off, and B3 is a range in which the thyristor TH is turned on. Vt1 is a trigger voltage of the trigger circuit. Specifically, Vt1 is a breakdown voltage of the Zener diode D1 constituting the trigger circuit, and is, for example, a voltage of about 7 V to 8 V. Vmax corresponds to a voltage of the external power supply, and is, for example, a maximum operating voltage. Vh is a hold voltage of the thyristor TH.

In a system in which the external power supply is directly coupled to the terminal T, when the voltage of the terminal T, which is a pad, exceeds the trigger voltage Vt1 as indicated by B4 due to noise or the like and the thyristor TH is turned on, as indicated by B5, a hold voltage Vh is smaller than Vmax of the external power supply. Therefore, a problem occurs that a current continues to flow from the external power supply to the thyristor TH.

Figure 3:
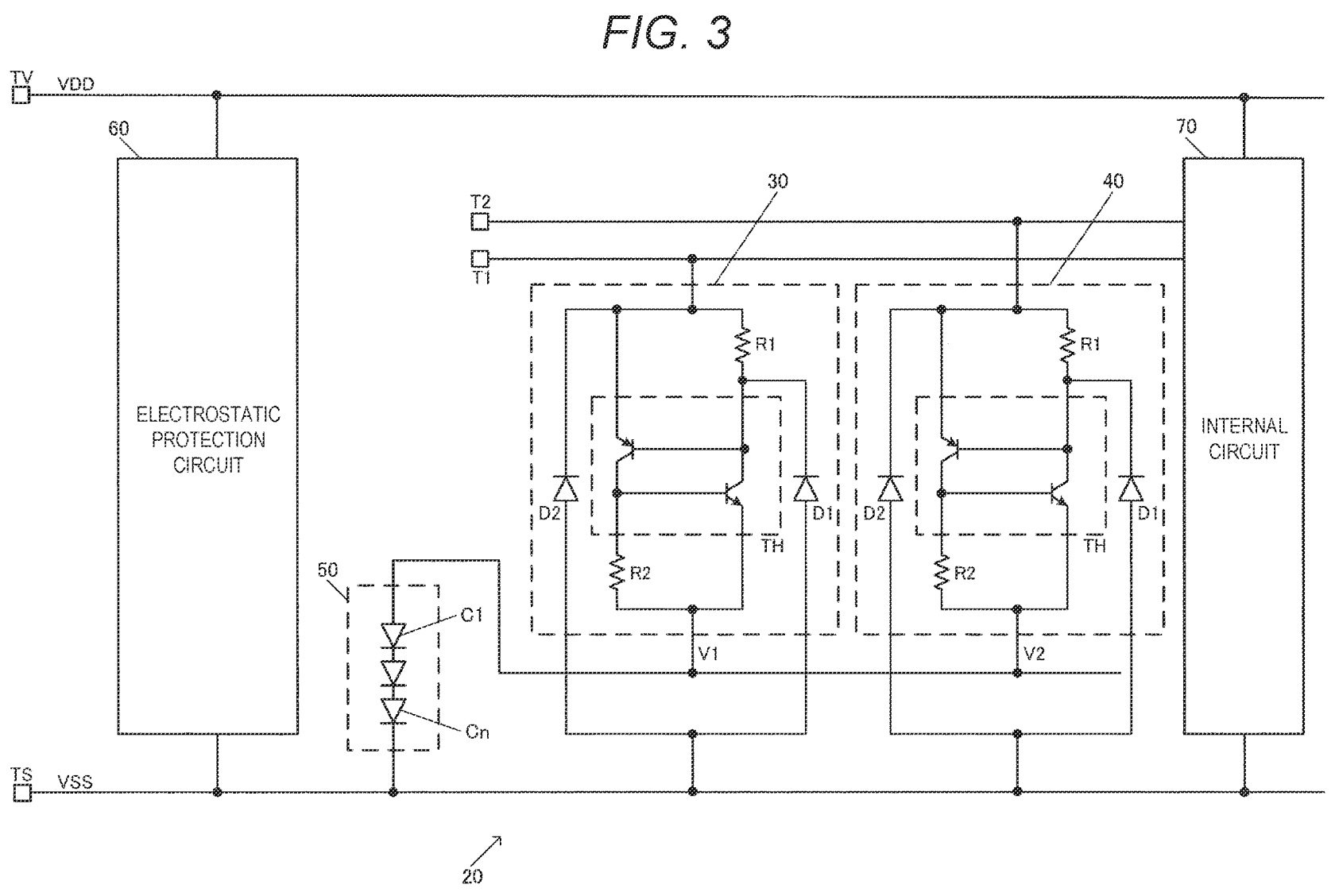

FIG. 3 shows a first configuration example of a circuit device 20 according to the present embodiment. The circuit device 20 according to the present embodiment includes a first terminal T1, a second terminal T2, a first thyristor circuit 30, and a second thyristor circuit 40. The circuit device 20 can include an electrostatic protection circuit 60 for power sources and an internal circuit 70.

The electrostatic protection circuit 60 is a circuit that is provided between a node of a power supply terminal TV of VDD, which is a high potential-side power supply, and a node of the power supply terminal TS of VSS, which is the low potential-side power supply, and that protects the internal circuit 70 from static electricity applied between the power supplies. The internal circuit 70 receives signals from the first terminal T1 and the second terminal T2, and operates by being supplied with VDD and VSS.

The internal circuit 70 is various circuits provided in the circuit device 20. For example, the internal circuit 70 includes an NMOS open-drain transistor in which the first terminal T1 and the second terminal T2 are coupled to a drain. In the present embodiment, when the first terminal T1 and the second terminal T2 are terminals having a tolerant function, such as the NMOS open-drain terminal, the first thyristor circuit 30 and the second thyristor circuit 40 are provided as electrostatic protection circuits between the first terminal T1 and VSS and between the second terminal T2 and VSS, respectively. The tolerant function is a function that prevents a current from flowing from a signal terminal to a power supply even if a voltage higher than a power supply voltage is applied to the signal terminal from the outside.

One end of the first thyristor circuit 30 is coupled to the first terminal T1. One end of the second thyristor circuit 40 is coupled to the second terminal T2. The first terminal T1 and the second terminal T2 are external coupling terminals of the circuit device 20, and are implemented by, for example, pads of the circuit device 20. For example, in a pad region, a metal layer is exposed from a passivation film which is an insulating layer, and the exposed metal layer constitutes a pad which is a terminal of the circuit device 20. The first thyristor circuit 30 operates, for example, as an electrostatic protection circuit of the first terminal T1, and the second thyristor circuit 40 operates, for example, as an electrostatic protection circuit of the second terminal T2. In the present embodiment, in order to prevent the problem described with reference to FIG. 2 from occurring, a voltage setting circuit 50 is provided for setting a voltage at the other end of the first thyristor circuit 30 whose one end is coupled to the first terminal T1 and a voltage at the other end of the second thyristor circuit 40 whose one end is coupled to the second terminal T2. The voltage setting circuit 50 can also be called a hold circuit or a voltage clamping circuit. The coupling in the present embodiment is electrical coupling. The electrical coupling is coupling in which electrical signals can be transmitted, and is coupling in which information can be transmitted by the electrical signals. The electrical coupling may be coupling established via a passive element or the like.

Each of the first thyristor circuit 30 and the second thyristor circuit 40 includes the thyristor TH. Each thyristor circuit can include the resistors R1 and R2 and the diode D1. Further, each thyristor circuit can include a diode D2. The diode D2 operates as an electrostatic protection element when a surge current caused by static electricity flows from the power supply terminal TS of VSS to the first terminal T1 and the second terminal T2, and is a diode whose forward direction is a direction from VSS to the first terminal T1 and the second terminal T2. The other configurations and operations of the first thyristor circuit 30 and the second thyristor circuit 40 are the same as those of the thyristor circuit 28 described with reference to FIGS. 1 and 2, and thus detailed description thereof will be omitted.

In the present embodiment, the voltage setting circuit 50 is shared by the first thyristor circuit 30 and the second thyristor circuit 40. Specifically, the voltage setting circuit 50 is shared by the first thyristor circuit 30 and the second thyristor circuit 40, and a current from the first thyristor circuit 30 when the first thyristor circuit 30 is turned on and a current from the second thyristor circuit 40 when the second thyristor circuit 40 is turned on flow. For example, when static electricity is applied to the first terminal T1, due to breakdown of the diode D1 of the first thyristor circuit 30, the thyristor TH of the first thyristor circuit 30 is turned on, and a surge current caused by static electricity flows through the first thyristor circuit 30. The surge current also flows through the voltage setting circuit 50 shared by the first thyristor circuit 30 and the second thyristor circuit 40, and flows through the power supply terminal TS of VSS. When static electricity is applied to the second terminal T2, due to breakdown of the diode D1 of the second thyristor circuit 40, the thyristor TH of the second thyristor circuit 40 is turned on, and a surge current caused by static electricity flows through the second thyristor circuit 40. The surge current also flows through the voltage setting circuit 50 shared by the first thyristor circuit 30 and the second thyristor circuit 40, and flows through the power supply terminal TS of VSS. Thus, when static electricity is applied to the first terminal T1 and the second terminal T2, a surge current caused by static electricity flows through the first thyristor circuit 30 and the second thyristor circuit 40, so that the internal circuit 70 of the circuit device 20 can be protected from static electricity.

The voltage setting circuit 50 sets a voltage at the other end of the first thyristor circuit 30 to a first voltage V1 when the first thyristor circuit 30 is turned on. The voltage setting circuit 50 sets a voltage at the other end of the second thyristor circuit 40 to a second voltage V2 when the second thyristor circuit 40 is turned on. For example, in FIG. 3, the first voltage V1 and the second voltage V2 may be the same voltage, and the first voltage V1 and the second voltage V2 may be different voltages. The voltage setting circuit 50 includes a first voltage clamping element C1 to an n-th voltage clamping element Cn coupled in series. Here, since n is an integer of 2 or more, and n=3 in FIG. 3, the first voltage clamping element C1 to the n-th voltage clamping element Cn are the first voltage clamping elements C1 to the third voltage clamping element C3. In FIG. 3, each of the voltage clamping elements C1 to Cn is implemented by a diode.

Figure 4:
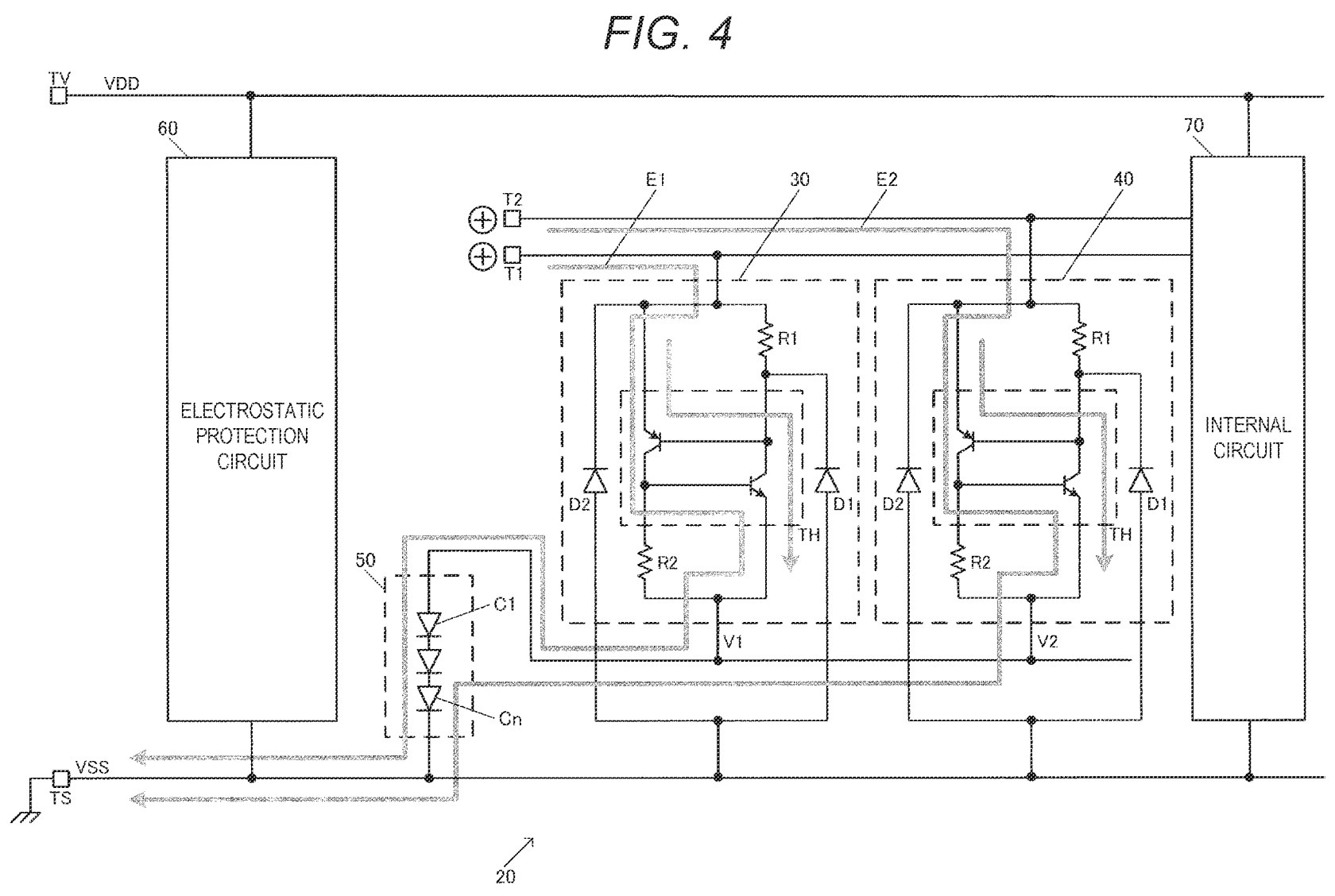

FIG. 4 is a diagram showing a discharge path of a current when static electricity having a positive polarity is applied to the first terminal T1 or the second terminal T2 with VSS=GND. For example, as indicated by E1 in FIG. 4, when static electricity is applied to the first terminal T1, the first thyristor circuit 30 is turned on and a surge current flows, the surge current flows through the shared voltage setting circuit 50. Accordingly, the voltage setting circuit 50 sets the voltage at the other end of the first thyristor circuit 30 whose one end is coupled to the first terminal T1 to the first voltage V1. That is, the voltage setting circuit 50 generates the first voltage V1 by the flow of the surge current from the first thyristor circuit 30, and sets the voltage at the other end of the first thyristor circuit 30 to the first voltage V1. The first voltage V1 can also be referred to as, for example, a first clamping voltage or a first hold voltage. Here, one end of the first thyristor circuit 30 is either an anode or a cathode of the first thyristor circuit 30, and is the anode in FIG. 3. That is, in FIG. 3, the anode, which is one end of the first thyristor circuit 30, is coupled to the first terminal T1. The other end of the first thyristor circuit 30 is, for example, the other one of the anode and the cathode of the first thyristor circuit 30, and is the cathode in FIG. 3. That is, in FIG. 3, the cathode, which is the other end of the first thyristor circuit 30, is coupled to the voltage setting circuit 50. For example, the anode of the first thyristor circuit 30 corresponds to the emitter of the bipolar transistor Q1 in FIG. 1, and the cathode of the first thyristor circuit 30 corresponds to the emitter of the bipolar transistor Q2. The base of the bipolar transistor Q1 of the first thyristor circuit 30 corresponds to a gate of the first thyristor circuit 30. A cathode of the diode D1 serving as a trigger circuit and the other end of the resistor R1 are coupled to the gate of the first thyristor circuit 30. As will be described later, one end of the first thyristor circuit 30 may be a cathode, and the other end may be an anode.

As shown with E2 in FIG. 4, when static electricity is applied to the second terminal T2, the second thyristor circuit 40 is turned on and a surge current flows, the surge current flows through the shared voltage setting circuit 50. Accordingly, the voltage setting circuit 50 sets the voltage at the other end of the second thyristor circuit 40 whose one end is coupled to the second terminal T2 to the second voltage V2. That is, the voltage setting circuit 50 generates the second voltage V2 by the flow of the surge current from the second thyristor circuit 40, and sets the voltage at the other end of the second thyristor circuit 40 to the second voltage V2. The second voltage V2 can also be referred to as, for example, a second clamping voltage or a second hold voltage. Here, one end of the second thyristor circuit 40 is either an anode or a cathode of the second thyristor circuit 40, and is the anode in FIG. 3. That is, in FIG. 3, the anode, which is one end of the second thyristor circuit 40, is coupled to the second terminal T2. The other end of the second thyristor circuit 40 is, for example, the other one of the anode and the cathode of the second thyristor circuit 40, and is the cathode in FIG. 3. That is, in FIG. 3, the cathode, which is the other end of the second thyristor circuit 40, is coupled to the voltage setting circuit 50. For example, the anode of the second thyristor circuit 40 corresponds to the emitter of the bipolar transistor Q1 in FIG. 1, and the cathode of the second thyristor circuit 40 corresponds to the emitter of the bipolar transistor Q2. The base of the bipolar transistor Q1 of the second thyristor circuit 40 corresponds to a gate of the second thyristor circuit 40. A cathode of the diode D1 serving as a trigger circuit and the other end of the resistor R1 are coupled to the gate of the second thyristor circuit 40. As will be described later, one end of the second thyristor circuit 40 may be a cathode, and the other end may be an anode.

Figure 5:
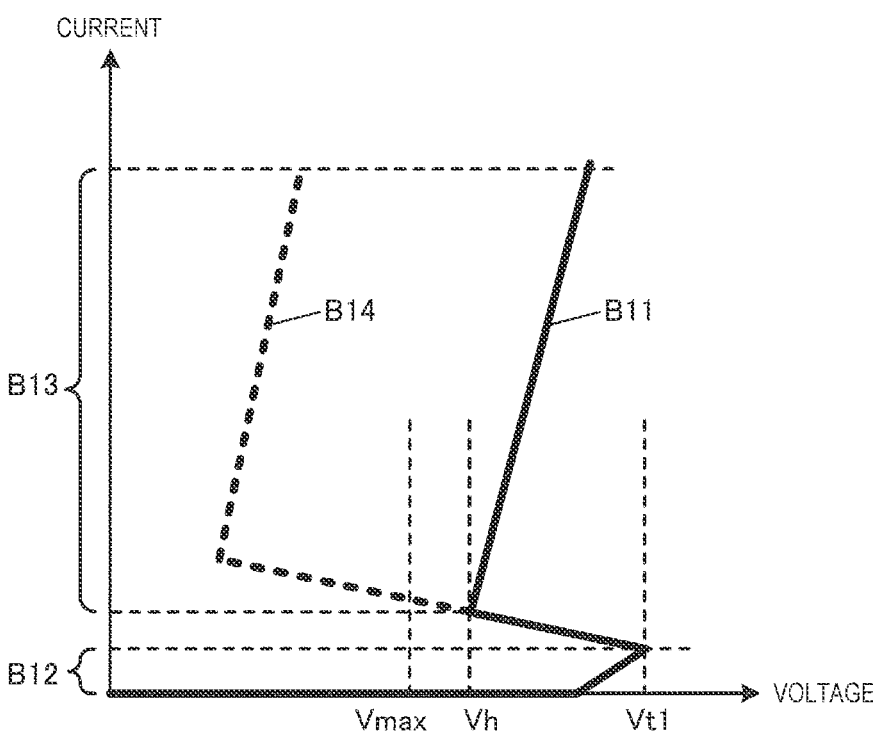
FIG. 5 is a voltage-current characteristic diagram illustrating an operation according to the present embodiment.

FIG. 5 is a voltage-current characteristic diagram illustrating an operation of the circuit device 20 according to the present embodiment. B11 in FIG. 5 is a voltage-current characteristic of a current flowing through the thyristor TH. B12 is a range in which the thyristor TH is turned off, and B13 is a range in which the thyristor TH is turned on. Vt1 is a trigger voltage, which is a breakdown voltage of the Zener diode D1 constituting the trigger circuit. Vmax corresponds to a voltage of the external power supply, and is for example, the maximum operating voltage. For example, it is determined as an operation guarantee specification that a voltage equal to or lower than Vmax, which is the maximum operating voltage, is supplied to the first terminal T1 and the second terminal T2. Vh is a total hold voltage corresponding to a sum of a hold voltage of a thyristor circuit, which is the first thyristor circuit 30 or the second thyristor circuit 40, and a hold voltage of the voltage setting circuit 50. The hold voltage of the thyristor circuit is the hold voltage of the thyristor TH included in the thyristor circuit. The hold voltage of the voltage setting circuit 50 is, for example, a clamping voltage of the voltage setting circuit 50, and is, for example, a clamping voltage generated by the first voltage clamping element C1 to the n-th voltage clamping element Cn when a current flows through the voltage clamping elements C1 to Cn. When the voltage clamping elements C1 to Cn are diodes as shown in FIG. 3, the clamping voltage of the voltage setting circuit 50 is, for example, a sum of forwarding voltages of the diodes of the voltage clamping elements C1 to Cn. Hereinafter, the first thyristor circuit 30 or the second thyristor circuit 40 may be simply referred to as a thyristor circuit.

As shown in FIG. 3, in the present embodiment, since each of the first thyristor circuit 30 and the second thyristor circuit 40 is coupled to the voltage setting circuit 50 in series, the total hold voltage Vh can be increased as shown in the following equation.

$$Vh = Vh(TH) + Vh(C1) + Vh(C2) + Vh(C3) = Vh(TH) + Vh(C)$$

Here, Vh(TH) is the hold voltage of the thyristor TH, Vh(C1), Vh(C2), and Vh(C3) are hold voltages of the voltage clamping elements C1, C2, and C3, respectively, and are clamping voltages. Vh(C) is a total hold voltage of the first voltage clamping element C1 to the third voltage clamping element C3. When the first voltage clamping element C1 to the third voltage clamping element C3 are diodes, Vh(C1), Vh(C2), and Vh(C3) are the forwarding voltages of the diodes of the voltage clamping elements C1 to C3, respectively. For example, in the above equation (1), when Vh(TH)=1.2 V, Vh(C1)=Vh(C2)=Vh(C3)=1 V, Vh=Vh(TH)+Vh(C1)+Vh(C2)+Vh(C3)=Vh(TH)+Vh(C)= 1.2 V+3×1 V=4.2 V.

In B11 of FIG. 5, since the hold voltage satisfies the relationship of Vh>Vmax, even when the thyristor circuit is turned on, it is possible to prevent the thyristor circuit from being kept on and falling into a state in which a current continues to flow.

On the other hand, in B14 of FIG. 5, since Vh<Vmax, after the thyristor circuit is turned on, there is a problem that the thyristor circuit falls into a state in which a current continues to flow from the external power supply to the thyristor circuit. For example, in the circuit device 20, the first terminal T1 and the second terminal T2 may be pulled up to a voltage level of VDD on an external circuit substrate or the like and set to a high level. In this case, when the first terminal T1 and the second terminal T2 are pulled up via a pull-up resistor, the pull-up resistor functions as a current limiting resistor, and as described above, it is possible to avoid a state in which a current continues to flow from the external power supply to the thyristor circuit. However, in a case in which, for example, the first terminal T1 and the second terminal T2 are directly coupled to the external power supply of VDD without providing such a pull-up resistor or the like, when the thyristor circuit is turned on due to noise or the like, a state in which a current continues to flow from the external power supply to the thyristor circuit occurs.

In this regard, according to the circuit device 20 according to the present embodiment in FIG. 3, by providing the voltage setting circuit 50 that generates Vh(C)=Vh(C1)+Vh(C2)+Vh(C3) as the hold voltage when a current flows from the thyristor circuit, the total hold voltage is raised to Vh=Vh(TH)+Vh(C). Accordingly, as indicated by B11 of FIG. 5, Vh>Vmax is satisfied, and it is possible to avoid the state in which the current continues to flow from the external power supply to the thyristor circuit.

However, when the voltage setting circuit 50 is provided for a plurality of terminals included in the circuit device 20 such that the voltage setting circuit 50 is provided for the first terminal T1 and is also provided for the second terminal T2 as in JP-A-2019-036647, for example, the voltage setting circuit 50 needs to be provided for the circuit device 20 by the number of terminals, and a chip area of the circuit device 20 increases. In particular, when the number of terminals of the circuit device 20 is large, an area occupied by the voltage setting circuit 50, which is a hold circuit, in the circuit device 20 increases, which leads to an increase in scale of the circuit device 20.

Therefore, in the present embodiment, as shown in FIG. 3, the voltage setting circuit 50 is shared by the first thyristor circuit 30 constituting an electrostatic protection circuit for the first terminal T1 and the second thyristor circuit 40 constituting an electrostatic protection circuit for the second terminal T2. For example, the voltage setting circuit 50 is coupled to the other end of the first thyristor circuit 30 whose one end is coupled to the first terminal T1, and is also coupled to the other end of the second thyristor circuit 40 whose one end is coupled to the second terminal T2. When static electricity is applied to the first terminal T1 and the first thyristor circuit 30 is turned on, a current flowing through the first thyristor circuit 30 flows through the shared voltage setting circuit 50, so that the voltage setting circuit 50 sets the voltage at the other end of the first thyristor circuit 30 to the first voltage V1. When static electricity is applied to the second terminal T2 and the second thyristor circuit 40 is turned on, a current flowing through the second thyristor circuit 40 flows through the shared voltage setting circuit 50, so that the voltage setting circuit 50 sets the voltage at the other end of the second thyristor circuit 40 to the second voltage V2. In this manner, a voltage obtained by adding the first voltage V1 set by the voltage setting circuit 50 to the hold voltage Vh(TH) of the thyristor TH of the first thyristor circuit 30 is set as the total hold voltage Vh, and a voltage obtained by adding the second voltage V2 set by the voltage setting circuit 50 to the hold voltage Vh(TH) of the thyristor TH of the second thyristor circuit 40 is set as the total hold voltage Vh.

Specifically, the hold voltage of each of the thyristors TH of the first thyristor circuit 30 and the second thyristor circuit 40 is set to Vh(TH), the first voltage is set to V1, the second voltage is set to V2, a maximum operating voltage of the first terminal T1 is set to Vmax1, and a maximum operating voltage of the second terminal T2 is set to Vmax2. In this case, in the present embodiment, the relationship of Vmax1<V1+Vh(TH) and Vmax2<V2+Vh(TH) is satisfied.

Accordingly, as indicated by B11 of FIG. 5, since a relationship in which the total hold voltage Vh is greater than Vmax1 or Vmax2 is satisfied, when the first thyristor circuit 30 and the second thyristor circuit 40 are turned on due to noise or the like, it is possible to prevent a state in which a current continues to flow from the external power supply through the first thyristor circuit 30 and the second thyristor circuit 40. Vmax1 and Vmax2 may be the same voltage such as Vmax=Vmax1=Vmax2, or may be different voltages.

In FIG. 3, the voltage setting circuit 50 is shared by the first thyristor circuit 30 and the second thyristor circuit 40. Therefore, since one voltage setting circuit 50 may be provided for two terminals, that is, the first terminal T1 and the second terminal T2, a circuit area of the circuit device 20 can be reduced as compared with a method disclosed in JP-A-2019-036647 in which the voltage setting circuit 50 is provided for each terminal. Therefore, it is possible to realize both prevention of the problem that the current continues to flow through the thyristor circuit and a reduction in the circuit area.

In FIG. 3, the first voltage V1 set at the other end of the first thyristor circuit 30 by the voltage setting circuit 50 and the second voltage V2 set at the other end of the second thyristor circuit 40 by the voltage setting circuit 50 are the same voltage. In this manner, a hold voltage at the first terminal T1 set by the first thyristor circuit 30 and the voltage setting circuit 50 and a hold voltage at the second terminal T2 set by the second thyristor circuit 40 and the voltage setting circuit 50 can be set to the same voltage. In other words, when the hold voltage of each of the thyristors TH of the first thyristor circuit 30 and the second thyristor circuit 40 is set to Vh(TH), the total hold voltage Vh at the first terminal T1 and the total hold voltage Vh at the second terminal T2 can be set to Vh=Vh(TH)+V1=Vh(TH)+V2.

Accordingly, when the maximum operating voltage is set to Vmax, Vmax<Vh=Vh(TH)+V1=Vh(TH)+V2 is satisfied, and the problem that the current continues to flow through the first thyristor circuit 30 and the second thyristor circuit 40 can be prevented.

In the present embodiment, the voltage setting circuit 50 includes the first voltage clamping element C1 to the n-th voltage clamping element Cn coupled in series. In FIG. 3, the first voltage clamping element C1 to the n-th voltage clamping element Cn are provided in series between the other end of the first thyristor circuit 30 and the other end of the second thyristor circuit 40 and a power supply node of VSS. The voltage clamping element is, for example, an element in which a voltage across the voltage clamping element is clamped to a predetermined voltage when a current flows through the voltage clamping element. A diode is used as the voltage clamping element in FIG. 3, but the voltage clamping element to be described later is not limited to the diode, and various elements capable of generating various clamping voltages can be adopted. In this manner, by configuring the voltage setting circuit 50 by the voltage clamping elements C1 to Cn coupled in series, the voltage at the other end of the first thyristor circuit 30 can be set to the first voltage V1 or the voltage at the other end of the second thyristor circuit 40 can be set to the second voltage V2 using the clamping voltages generated by the current flowing through one or a plurality of voltage clamping elements.

In the present embodiment, the other end of the first thyristor circuit 30 and the other end of the second thyristor circuit 40 are coupled to an anode of the first voltage clamping element C1 of the first voltage clamping element C1 to the n-th voltage clamping element Cn. For example, the cathodes, which are the other ends of the first thyristor circuit 30 and the second thyristor circuit 40, are coupled to the anode of the first voltage clamping element C1. In this manner, when the hold voltages, which are the clamping voltages, of the first voltage clamping element C1 to the n-th voltage clamping element Cn are set to Vh(C1) to Vh(Cn), the first voltage V1 at the other end of the first thyristor circuit 30 and the second voltage V2 at the other end of the second thyristor circuit 40 can be set to V1=V2=Vh(C1)+Vh(C2)+ . . . +Vh(Cn). Accordingly, Vmax<Vh=Vh(TH)+Vh(C1)+Vh(C2)+. Vh(Cn) is satisfied, and the problem that the current continues to flow through the first thyristor circuit 30 and the second thyristor circuit 40 can be prevented.

In the present embodiment, a cathode of the n-th voltage clamping element Cn is coupled to the node of VSS which is the low potential-side power supply. In this manner, a current from the other end of the first thyristor circuit 30 or the second thyristor circuit 40 that is turned on flows from the cathode of the n-th voltage clamping element Cn to a VSS side, which is the low potential-side power supply, through one or more voltage clamping elements of the first voltage clamping element C1 to the n-th voltage clamping element Cn of the voltage setting circuit 50. Therefore, a current caused by static electricity applied to the first terminal T1 or the second terminal T2 can be caused to flow to the VSS side, which is the low potential-side power supply, and the internal circuit 70 can be protected from the static electricity.

FIG. 3 illustrates a case in which the voltage setting circuit 50 is shared by the two thyristor circuits, but the present embodiment is not limited thereto, and the voltage setting circuit 50 may be shared by three or more of the thyristor circuits. As the number of the thyristor circuits sharing the voltage setting circuit 50 is larger, an effect of reducing the circuit area by the sharing of the voltage setting circuit 50 is higher. However, when the voltage setting circuit 50 is shared by a large number of thyristor circuits and distances between the thyristor circuits and the voltage setting circuit 50 are increased, parasitic resistances or the like of a wiring coupling the thyristor circuits and the voltage setting circuit 50 are increased, and an electrostatic protection function or the like may be reduced. Therefore, for example, a first voltage setting circuit may be shared by a first thyristor circuit group constituting an electrostatic protection circuit for a first terminal group coupled to a first circuit group of the internal circuit 70, and a second voltage setting circuit may be shared by a second thyristor circuit group constituting an electrostatic protection circuit for a second terminal group coupled to a second circuit group of the internal circuit 70. Here, the first circuit group and the second circuit group are circuit groups whose distance is longer than the distance to the circuits in each circuit group in the circuit device 20. For example, the first circuit group is disposed in a first circuit region of the circuit device 20, and the second circuit group is disposed in a second circuit region of the circuit device 20. For example, the first circuit group may be a digital circuit group, and the second circuit group may be an analog circuit group. In this manner, noise or the like can be prevented from being transmitted from a digital terminal of the digital circuit group to an analog terminal of the analog circuit group.

In FIG. 3, the diode D1 is used as a trigger circuit of a thyristor circuit, and the trigger circuit may be any device or circuit in which a current starts to flow when a certain voltage is reached. For example, instead of the diode D1, a PMOS transistor, an NMOS transistor, a pnp bipolar transistor, an npn bipolar transistor, or a circuit in which these devices are coupled in series may be used as a trigger circuit of a thyristor circuit.

2. Second Configuration Example

Figure 6:
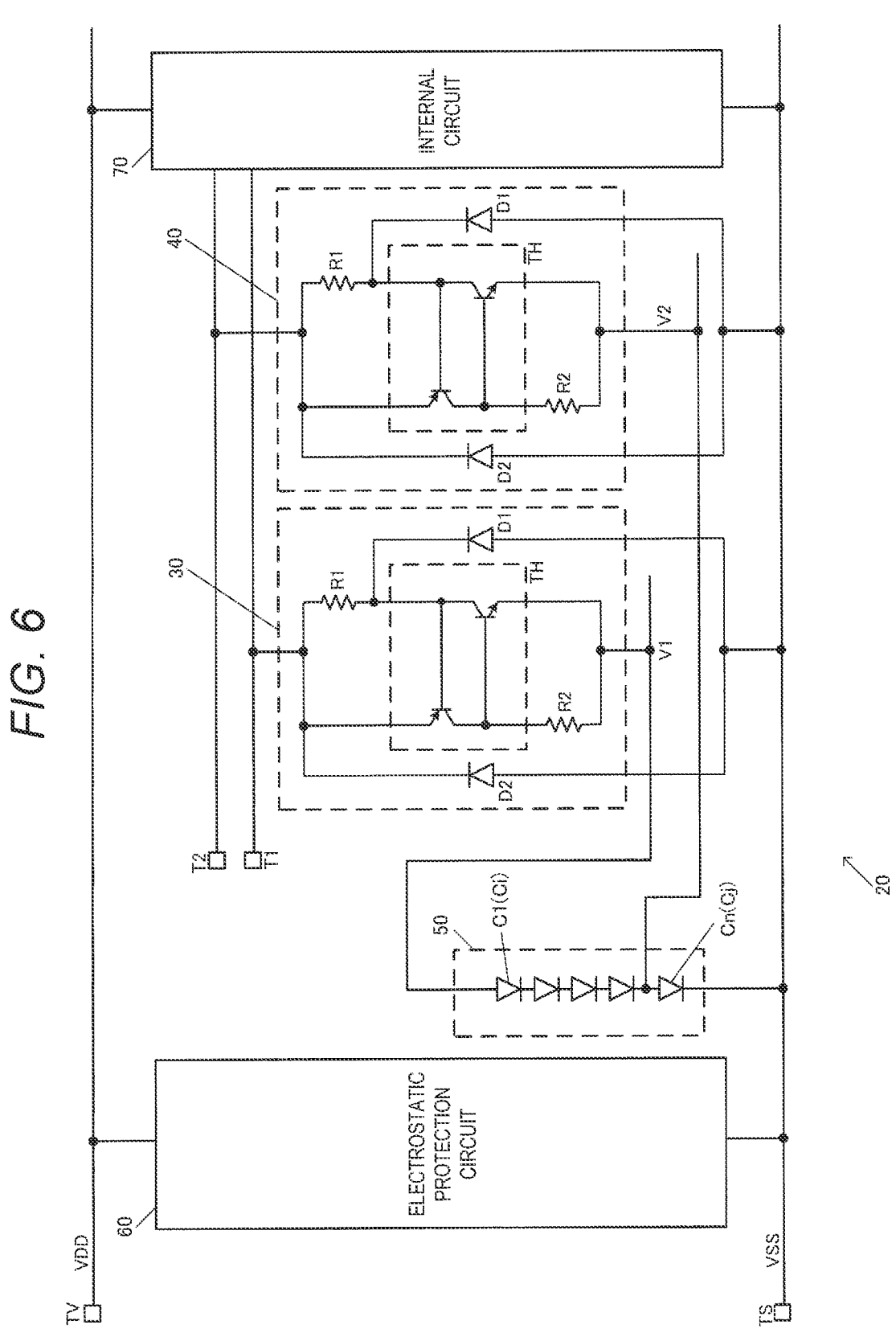
FIG. 6 is a second configuration example of the circuit device according to the present embodiment.
Figure 7:
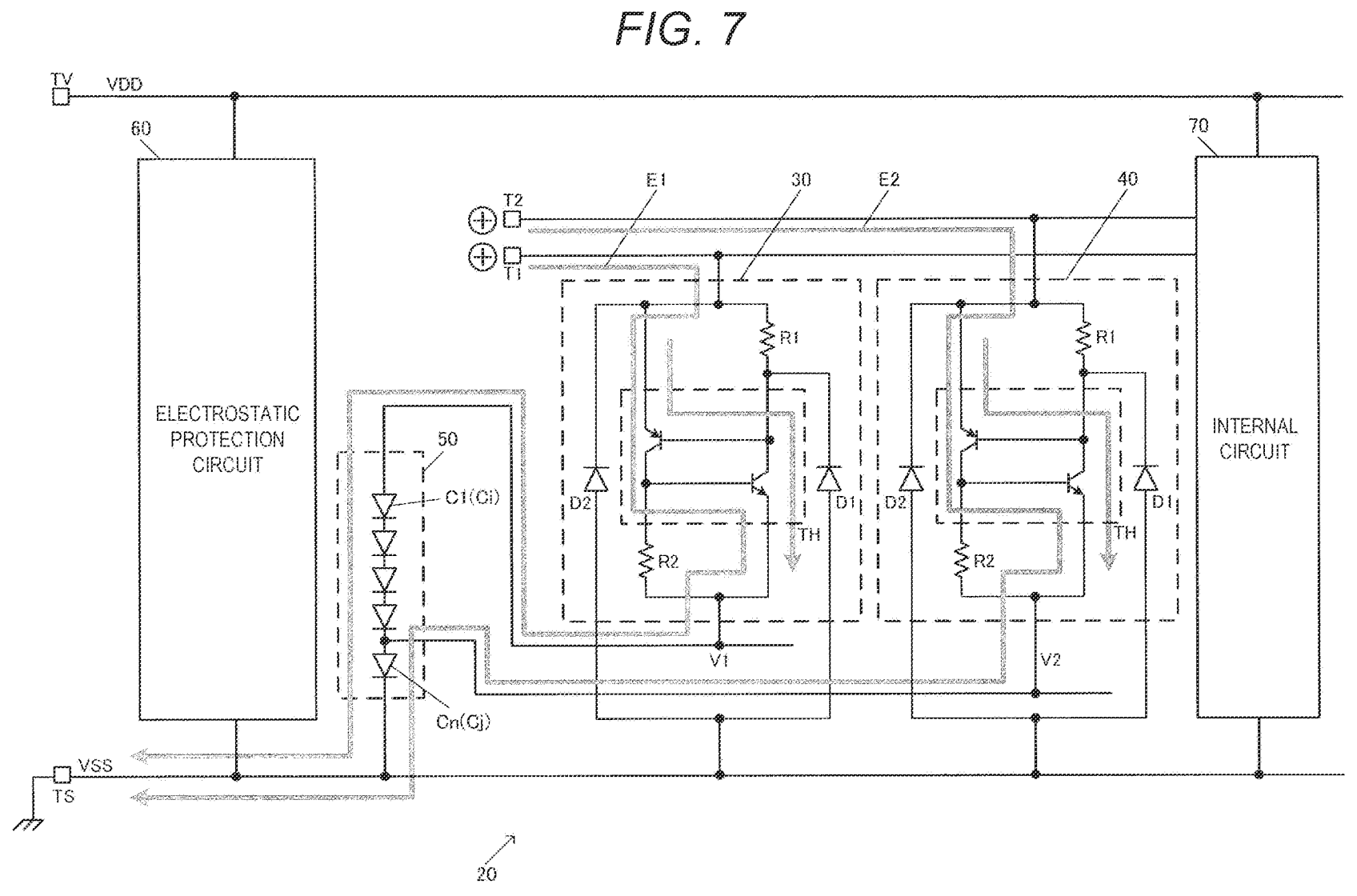

FIG. 6 shows a second configuration example of the circuit device 20 according to the present embodiment. E1 and E2 in FIG. 7 show discharge paths when static electricity having a positive polarity is applied to the first terminal T1 and the second terminal T2 with VSS=GND in the second configuration example. FIG. 6 is a configuration example in which cathodes, which are the other ends of the first thyristor circuit 30 and the second thyristor circuit 40, are coupled using an intermediate tap of the voltage setting circuit 50. Specifically, the other end of the first thyristor circuit 30 is coupled to the anode of the first voltage clamping element C1 which is an i-th voltage clamping element of the first voltage clamping element C1 to the n-th voltage clamping element Cn constituting the voltage setting circuit 50. The other end of the second thyristor circuit 40 is coupled to an anode of the n-th voltage clamping element Cn, which is a j-th voltage clamping element of the voltage setting circuit 50. FIG. 6 shows an example in the case of i=1 and j=n, in the present embodiment, i=1 and j=n are not limited, and i and j may be integers satisfying 1≤i<j≤n.

In this manner, the first voltage V1 set at the other end of the first thyristor circuit 30 by the voltage setting circuit 50 and the second voltage V2 set at the other end of the second thyristor circuit 40 by the voltage setting circuit 50 can be set to different voltages. Specifically, the voltage setting circuit 50 can set the voltage at the other end of the first thyristor circuit 30 to the first voltage V1 which satisfies, for example, V1=Vh(Ci)+ . . . +Vh(Cn). The voltage setting circuit 50 can set the voltage at the other end of the second thyristor circuit 40 to the second voltage V2 which satisfies, for example, V2=Vh(Cj)+ . . . +Vh(Cn). In this manner, a hold voltage Vh at the first terminal T1 set by the first thyristor circuit 30 and the voltage setting circuit 50 and a hold voltage Vh at the second terminal T2 set by the second thyristor circuit 40 and the voltage setting circuit 50 can be set to different voltages. Specifically, a hold voltage at the first terminal T1 can be set to, for example, Vh=Vh(TH)+Vh(Ci)+ . . . +Vh(Cn), and a hold voltage at the second terminal T2 can be set to, for example, Vh=Vh(TH)+Vh(Cj)+ . . . +Vh(Cn). Accordingly, even when an external power supply at the first terminal T1 and an external power supply at the second terminal T2 are different, it is possible to deal with the above.

For example, in FIG. 6, a hold voltage of each of the thyristors TH of the first thyristor circuit 30 and the second thyristor circuit 40 is set to Vh(TH)=1.2 V, and a hold voltage of each of the voltage clamping elements C1 to Cn of the voltage setting circuit 50 is set to Vh(C)=1 V. Thus, the hold voltages Vh(T1) and Vh(T2) at the first terminal T1 and the second terminal T2 are shown in the following equations, respectively.

$$Vh(T1)=Vh(TH)+Vh(C)\times5=6.2 \text{ V}$$

$$Vh(T2)=Vh(TH)+Vh(C)=2.2 \text{ V}$$

Therefore, even in a system in which the first terminal T1 is a terminal of an external power supply system of 5 V, and the external power supply of 5 V is directly coupled to first terminal T1, for example, it is possible to prevent the first thyristor circuit 30 that is turned on due to noise or the like from being kept on and falling into a state in which a current continues to flow. Even in a system in which the second terminal T2 is a terminal of an external power supply system of 1.8 V, and the external power supply of 1.8 V is directly coupled to the second terminal T2, for example, it is possible to prevent the second thyristor circuit 40 that is turned on due to noise or the like from being kept on and falling into a state in which a current continues to flow.

According to the second configuration example shown in FIG. 6, even when power supply specifications of the first terminal T1 and the second terminal T2 are different, since the voltage setting circuit 50 shared by the first thyristor circuit 30 for the first terminal T1 and the second thyristor circuit 40 for the second terminal T2 is used, an increase in an area occupied by the voltage setting circuit 50 in the circuit device 20 can be prevented.

3. Third Configuration Example

Figure 8:
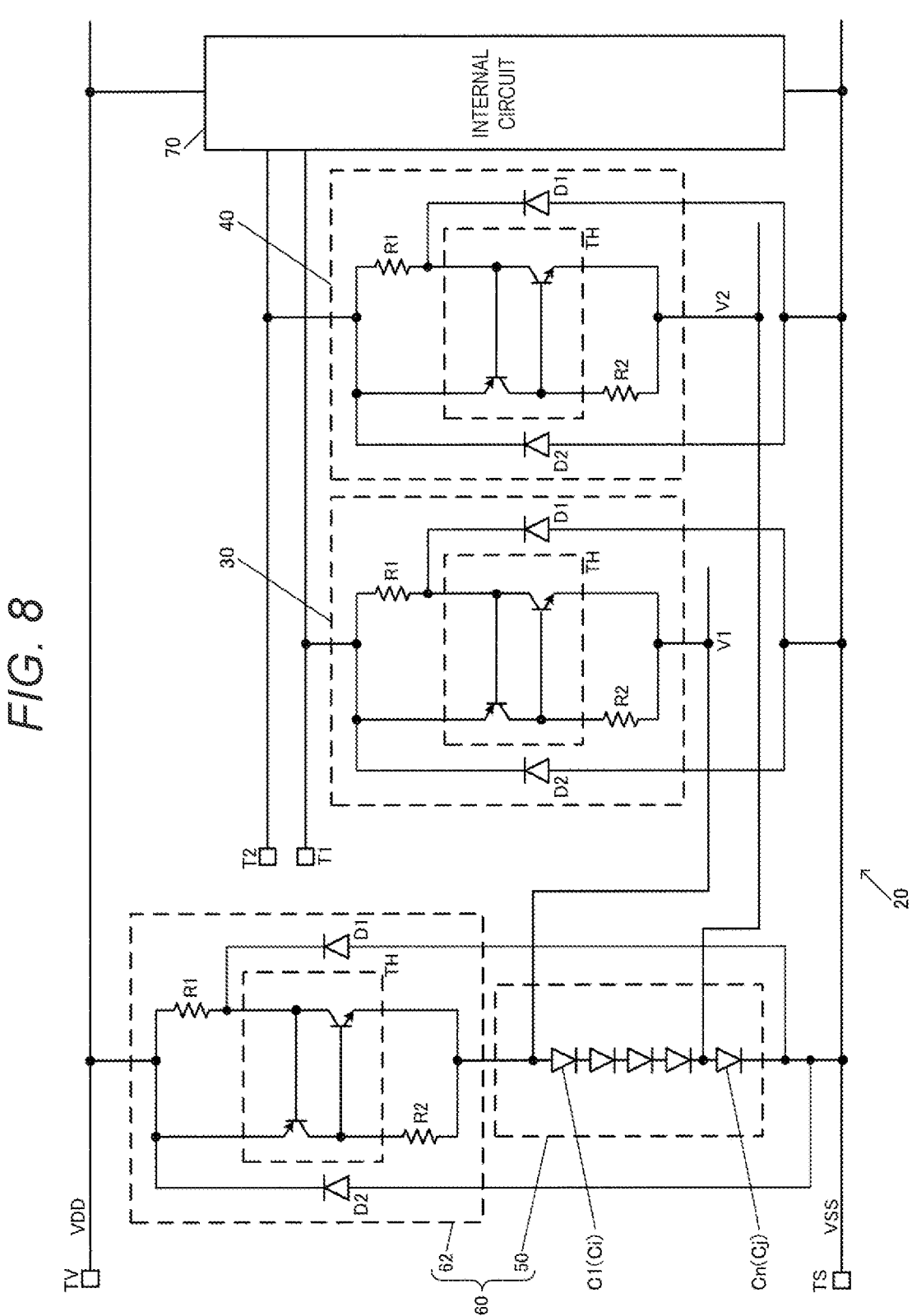
FIG. 8 is a third configuration example of the circuit device according to the present embodiment.
Figure 9:
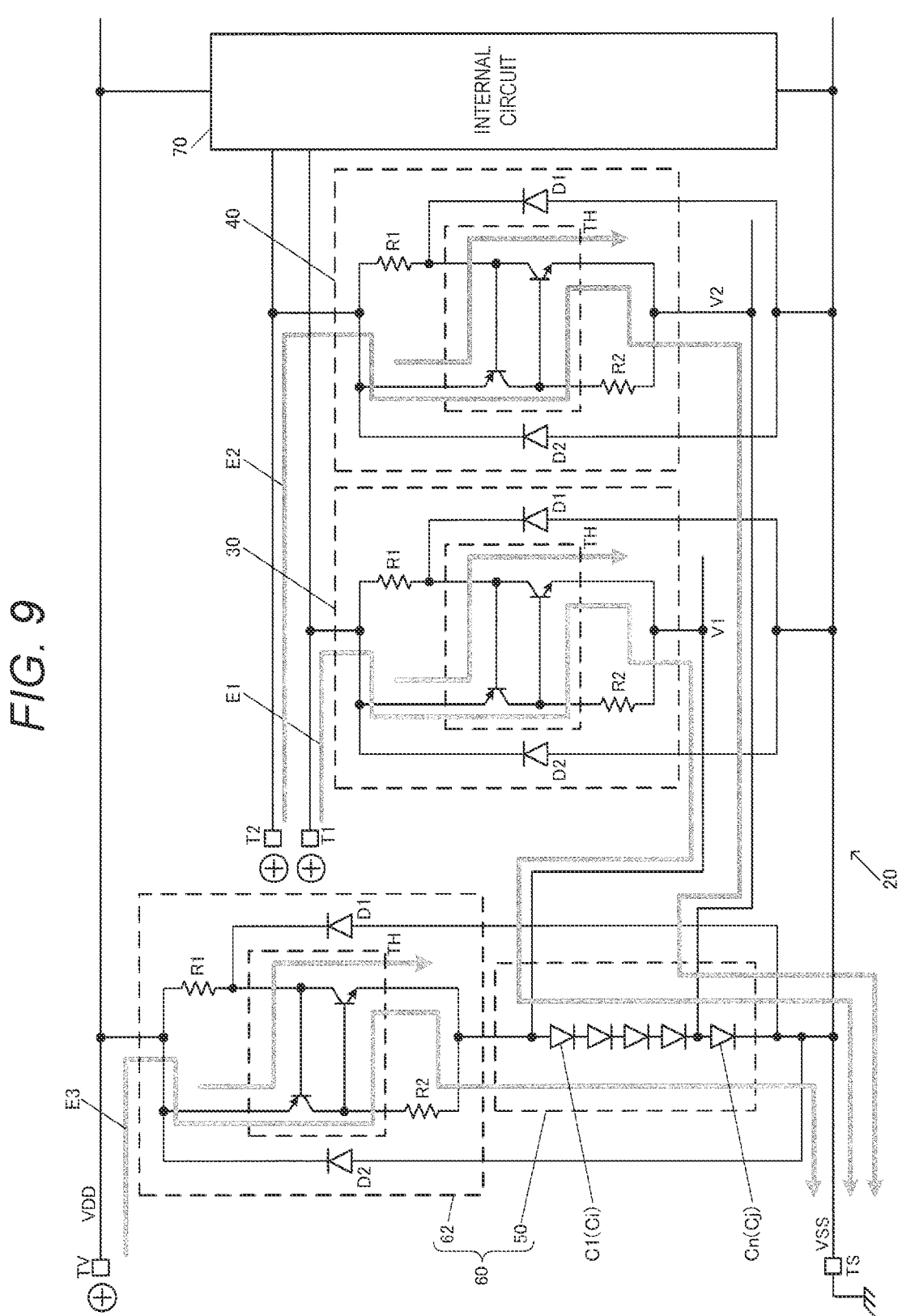
FIG. 9 is a diagram illustrating a discharge path in the third configuration example.

FIG. 8 shows a third configuration example of the circuit device 20 according to the present embodiment. E1 and E2 in FIG. 9 show discharge paths when static electricity having a positive polarity is applied to the first terminal T1 and the second terminal T2 with VSS=GND in the third configuration example.

In the third configuration example shown in FIG. 8, the voltage setting circuit 50, which is a hold circuit provided in the electrostatic protection circuit 60 between power supplies, is shared as a voltage setting circuit of the first thyristor circuit 30 and the second thyristor circuit 40. That is, the circuit device 20 according to the present embodiment includes the electrostatic protection circuit 60 between power supplies that is provided between a node of VDD which is a high potential-side power supply and a node of VSS which is a low potential-side power supply and that includes a third thyristor circuit 62. In FIG. 8, a voltage setting circuit shared by the first thyristor circuit 30 for the first terminal T1 and the second thyristor circuit 40 for the second terminal T2 is the voltage setting circuit 50 that is provided in the electrostatic protection circuit 60 between power supplies and that is coupled to the third thyristor circuit 62.

The third thyristor circuit 62 provided in the electrostatic protection circuit 60 has, for example, a configuration similar to that of the first thyristor circuit 30 and the second thyristor circuit 40, and includes, for example, the thyristor TH, the resistors R1 and R2, and the diodes D1 and D2. The voltage setting circuit 50 provided in the electrostatic protection circuit 60 includes the first voltage clamping element C1 to the n-th voltage clamping element Cn coupled in series. A cathode, which is the other end of the first thyristor circuit 30 for the first terminal T1, is coupled to the anode of the first voltage clamping element C1 of the voltage setting circuit 50 of the electrostatic protection circuit 60 between power supplies. A cathode, which is the other end of the second thyristor circuit 40 for the second terminal T2, is coupled to the anode of the n-th voltage clamping element Cn of the voltage setting circuit 50. Since i=1 and j=n in FIG. 8, the i-th voltage clamping element Ci to which the first thyristor circuit 30 is coupled is the first voltage clamping element C1, and the j-th voltage clamping element Cj to which the second thyristor circuit 40 is coupled is the n-th voltage clamping element Cn.

According to the third configuration example of FIG. 8, the voltage setting circuit 50 of the electrostatic protection circuit 60 between power supplies is effectively used as a voltage setting circuit shared by the first thyristor circuit 30 and the second thyristor circuit 40. Therefore, since it is not necessary to provide a separate dedicated voltage setting circuit for the first thyristor circuit 30 and the second thyristor circuit 40 and the voltage setting circuit 50 of the electrostatic protection circuit 60 is effectively used, an increase in an area occupied by the voltage setting circuit 50 in the circuit device 20 can be prevented.

4. Fourth Configuration Example

Figure 10:
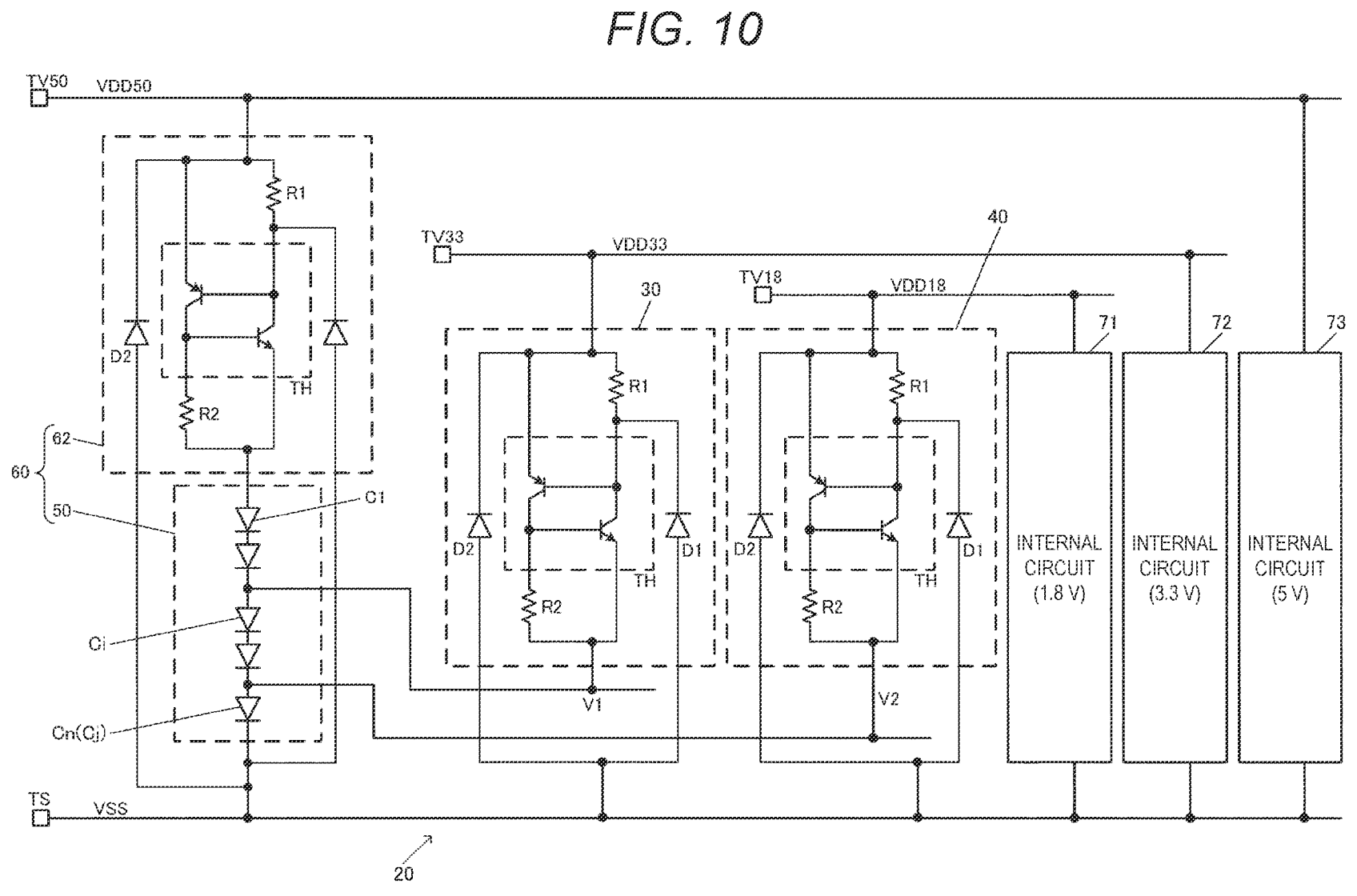
Figure 11:
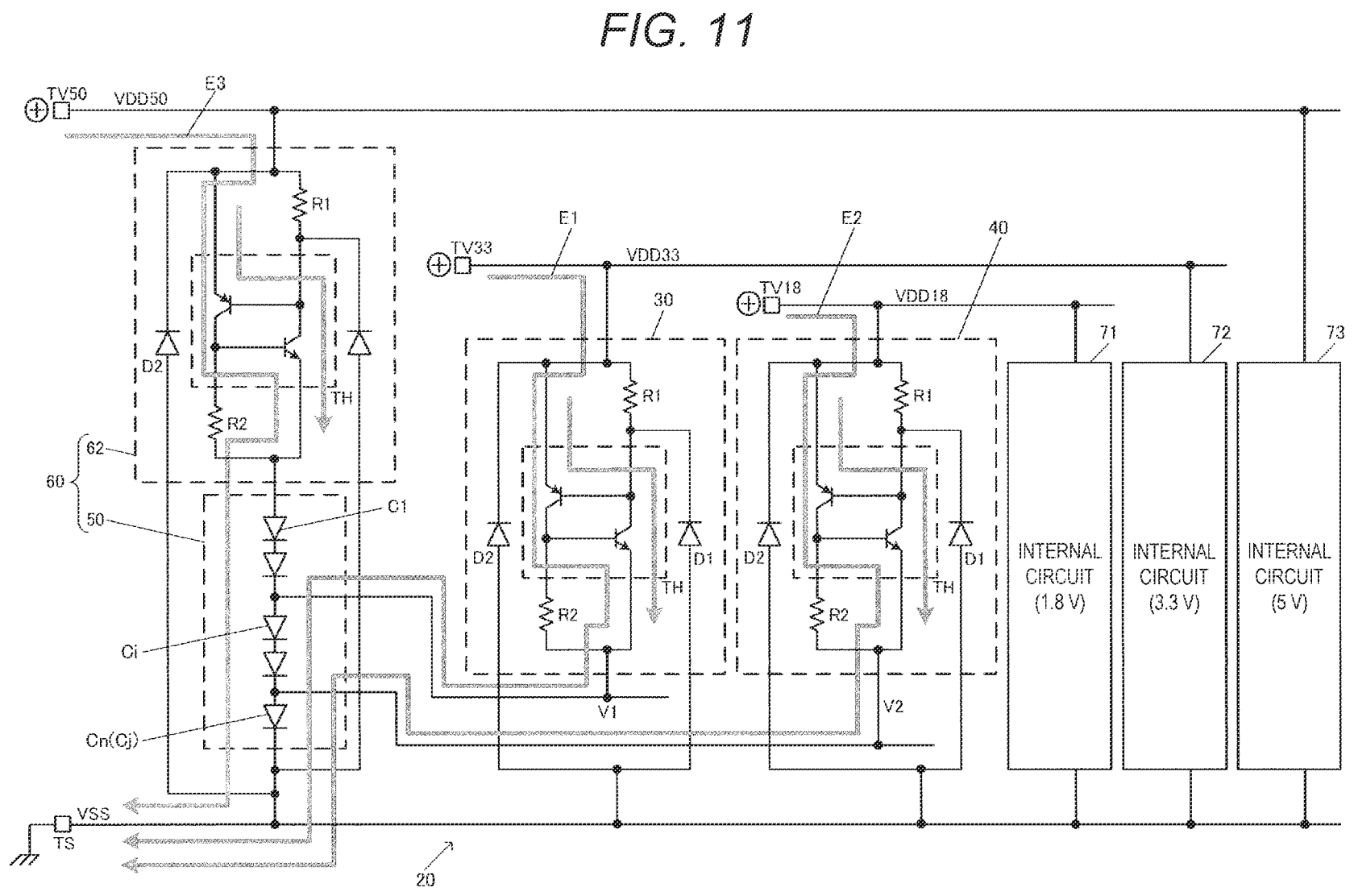

FIG. 10 shows a fourth configuration example of the circuit device 20 according to the present embodiment. E1, E2, and E3 of FIG. 11 show discharge paths when static electricity having a positive polarity is applied to power supply terminals TV33, TV18, and TV50 with VSS=GND in the fourth configuration example.

In FIG. 3, FIG. 6, and FIG. 8, the first terminal T1 and the second terminal T2 are input terminals. In FIG. 10, the first terminal is the power supply terminal TV33 of VDD33=3.3 V, and the second terminal is the power supply terminal TV18 of VDD18=1.8 V. As described above, the first terminal and the second terminal according to the present embodiment are not limited to the input terminals, and may be the power supply terminals.

For example, in FIG. 10, a hold voltage of each of the thyristors TH of the first thyristor circuit 30 and the second thyristor circuit 40 is set to Vh(TH)=1.2 V, and a hold voltage of each of the voltage clamping elements C1 to Cn of the voltage setting circuit 50 is set to Vh(C)=1 V. Thus, hold voltages Vh(TV50), Vh(TV33), and Vh(TV18) at the power supply terminals TV50, TV33, and TV18 are shown in the following equations, respectively.

$$Vh(TV50)=Vh(TH)+Vh(D)\times5=6.2 \text{ V}$$

$$Vh(TV33)=Vh(TH)+Vh(D)\times3=4.2 \text{ V}$$

$$Vh(TV18)=Vh(TH)+Vh(D)=2.2 \text{ V}$$

Therefore, in a system in which the power supply terminals TV50, TV33, and TV18 are directly coupled to external power supplies of 5 V, 3.3 V, and 1.8 V, respectively, it is possible to prevent the first thyristor circuit 30, the second thyristor circuit 40, and the third thyristor circuit 62 that are turned on due to noise or the like from being kept on and falling into a state in which a current continues to flow.

In this manner, according to the fourth configuration example, when a plurality of power supply terminals TV50, TV33, and TV18 having different power supply specifications are provided in the circuit device 20, the voltage setting circuit 50 can be shared by a plurality of thyristor circuits. Therefore, an increase in an area occupied by the voltage setting circuit 50 in the circuit device 20 can be prevented.

In the first to fourth configuration examples described above, a case has been described in which a voltage clamping element constituting the voltage setting circuit 50 is a diode. That is, in the present embodiment, at least one of the first voltage clamping element C1 to the n-th voltage clamping element Cn of the voltage setting circuit 50 is a diode. In this manner, a hold voltage is generated by the voltage setting circuit 50 using a forwarding voltage of the diode, the voltage at the other end of the first thyristor circuit 30 can be set to the first voltage V1 or the voltage at the other end of the second thyristor circuit 40 can be set to the second voltage V2. Accordingly, the total hold voltage Vh at each terminal can be set to a voltage higher than the hold voltage Vh(TH) of the thyristor TH, and it is possible to prevent the first thyristor circuit 30, the second thyristor circuit 40, and the like that are turned on due to noise or the like from being kept on and falling into a state in which a current continues to flow.

However, as described in fifth to seventh configuration examples to be described later, the voltage clamping element constituting the voltage setting circuit 50 is not limited to a diode, and may be implemented by a PMOS transistor, an NMOS transistor, a pnp bipolar transistor, an npn bipolar transistor, or the like.

5. Fifth Configuration Example

Figure 12:
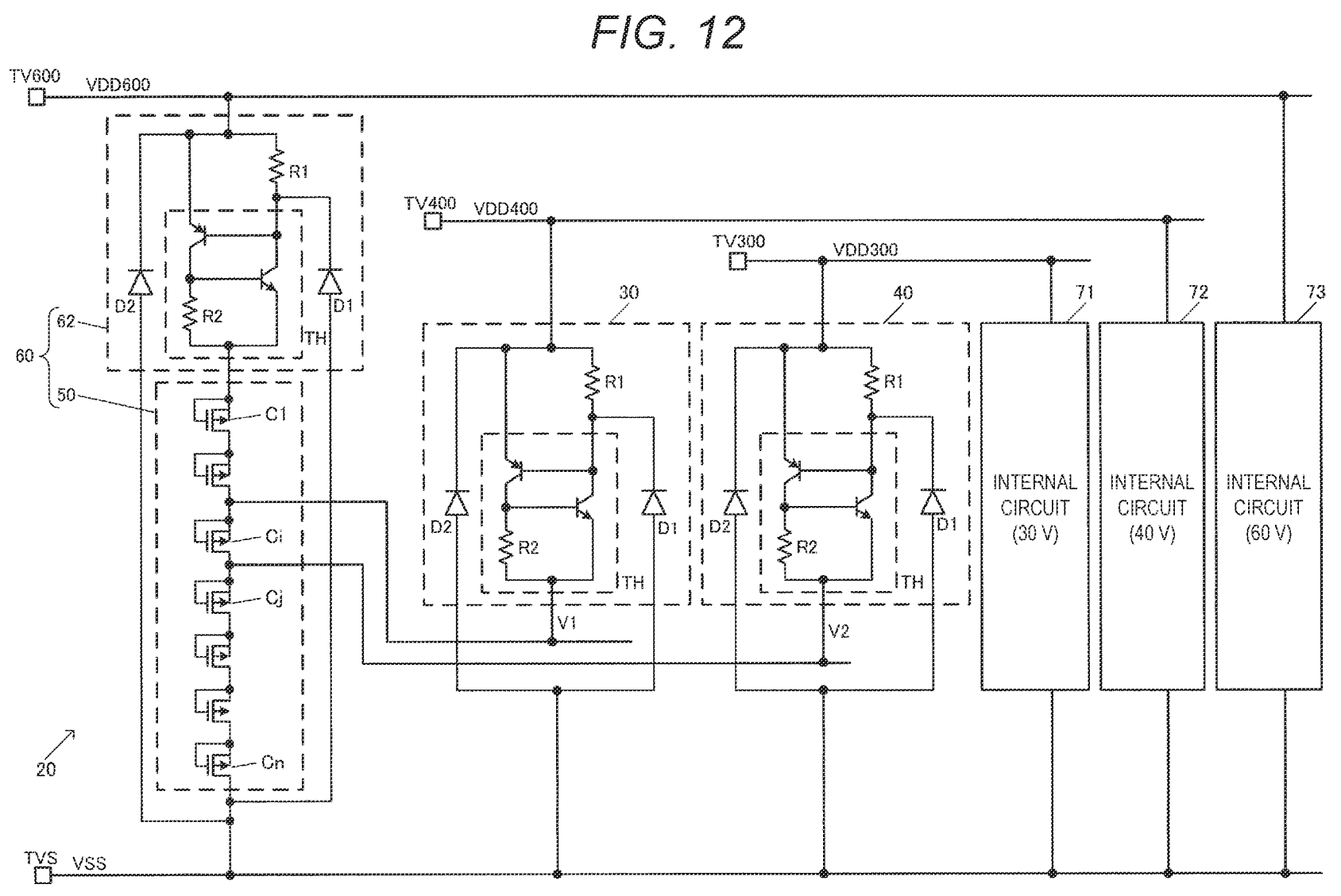

FIG. 12 shows the fifth configuration example of the circuit device 20 according to the present embodiment. In the fifth configuration example, PMOS transistors are used as voltage clamping elements constituting the voltage setting circuit 50. Specifically, each PMOS transistor in which a gate and a source are coupled is used as the voltage clamping element.

In the circuit device 20 shown in FIG. 12, an internal circuit 71 that operates by a power supply VDD300 of 30 V, an internal circuit 72 that operates by a power supply VDD400 of 40 V, and an internal circuit 73 that operates by a power supply VDD600 of 60 V are provided. A power supply terminal TV400 to which VDD400 is supplied, a power supply terminal TV300 to which VDD300 is supplied, and a power supply terminal TV600 to which VDD600 is supplied are provided. Here, the power supply terminal TV400 corresponds to a first terminal, and the power supply terminal TV300 corresponds to a second terminal. In this manner, the circuit device 20 in FIG. 12 is a product in which a power supply transistor of 60 V, a power supply transistor of 40 V, and a power supply transistor of 30 V are mixed.

In FIG. 12, an anode of the i-th voltage clamping element Ci, which is a source of the PMOS transistor constituting the voltage setting circuit 50, is coupled to the other end of the first thyristor circuit 30. An anode of the j-th voltage clamping element Cj, which is a source of the PMOS transistor constituting the voltage setting circuit 50, is coupled to the other end of the second thyristor circuit 40. FIG. 12 shows a case in which n=7, i=3, and j=4, and in the voltage setting circuit 50, seven PMOS transistors are coupled in series. The anode of the i-th voltage clamping element Ci=C3 that is a third PMOS transistor from a high potential side is coupled to the other end of the first thyristor circuit 30. The anode of the j-th voltage clamping element Cj=C4 which is a fourth PMOS transistor from the high potential side is coupled to the other end of the second thyristor circuit 40.

For example, in FIG. 12, a hold voltage of each of the thyristors TH of the first thyristor circuit 30 and the second thyristor circuit 40 is set to Vh(TH)=1.2 V, and a hold voltage of each of the PMOS transistors, which are the voltage clamping elements C1 to Cn of the voltage setting circuit 50, is set to Vh(PMOS)=9 V. Thus, hold voltages Vh(TV600), Vh(TV400), and Vh(TV300) at the power supply terminals TV600, TV400, and TV300 are shown in the following equations, respectively.

$$Vh(TV600)=Vh(TH)+Vh(\text{PMOS})\times7=64.2 \text{ V}$$

$$Vh(TV400)=Vh(TH)+Vh(\text{PMOS})\times5=46.2 \text{ V}$$

$$Vh(TV300)=Vh(TH)+Vh(\text{PMOS})\times4=37.2 \text{ V}$$

Therefore, even in a system in which the power supply terminals TV600, TV400, and TV300 are directly coupled to high voltage external power supplies such as 60 V, 40 V, and 30 V, respectively, it is possible to prevent the first thyristor circuit 30, the second thyristor circuit 40, and the third thyristor circuit 62 that are turned on due to noise or the like from being kept on and falling into a state in which a current continues to flow.

In this manner, according to the fifth configuration example, when a plurality of power supply terminals TV600, TV400, and TV300 having different power supply specifications are provided in the circuit device 20, the voltage setting circuit 50 can be shared by a plurality of thyristor circuits. Therefore, an increase in an area occupied by the voltage setting circuit 50 in the circuit device 20 can be prevented.

In the present embodiment, as shown in FIG. 12, at least one of the first voltage clamping element C1 to the n-th voltage clamping element Cn of the voltage setting circuit 50 is the PMOS transistor in which the source and the gate are coupled. The PMOS transistor is a transistor called source-gate connect PMOS (sgPMOS). When a current flows due to breakdown of the PMOS transistor that is turned off by coupling the source and the gate, as described above, for example, a hold voltage having a high voltage, for example, about Vh(PMOS)=9 V is generated between a drain and the source of the PMOS transistor. In this manner, by using the PMOS transistor in which the source and the gate are coupled as the voltage clamping element, a hold voltage Vh(PMOS) having a higher voltage can be generated as compared with the case in which the diode is used as the voltage clamping element. Therefore, it is possible to provide the voltage setting circuit 50 suitable for the circuit device 20 to which high voltage power supplies VDD500, VDD400, and VDD300 are supplied as shown in FIG. 5.

6. Sixth Configuration Example

Figure 13:
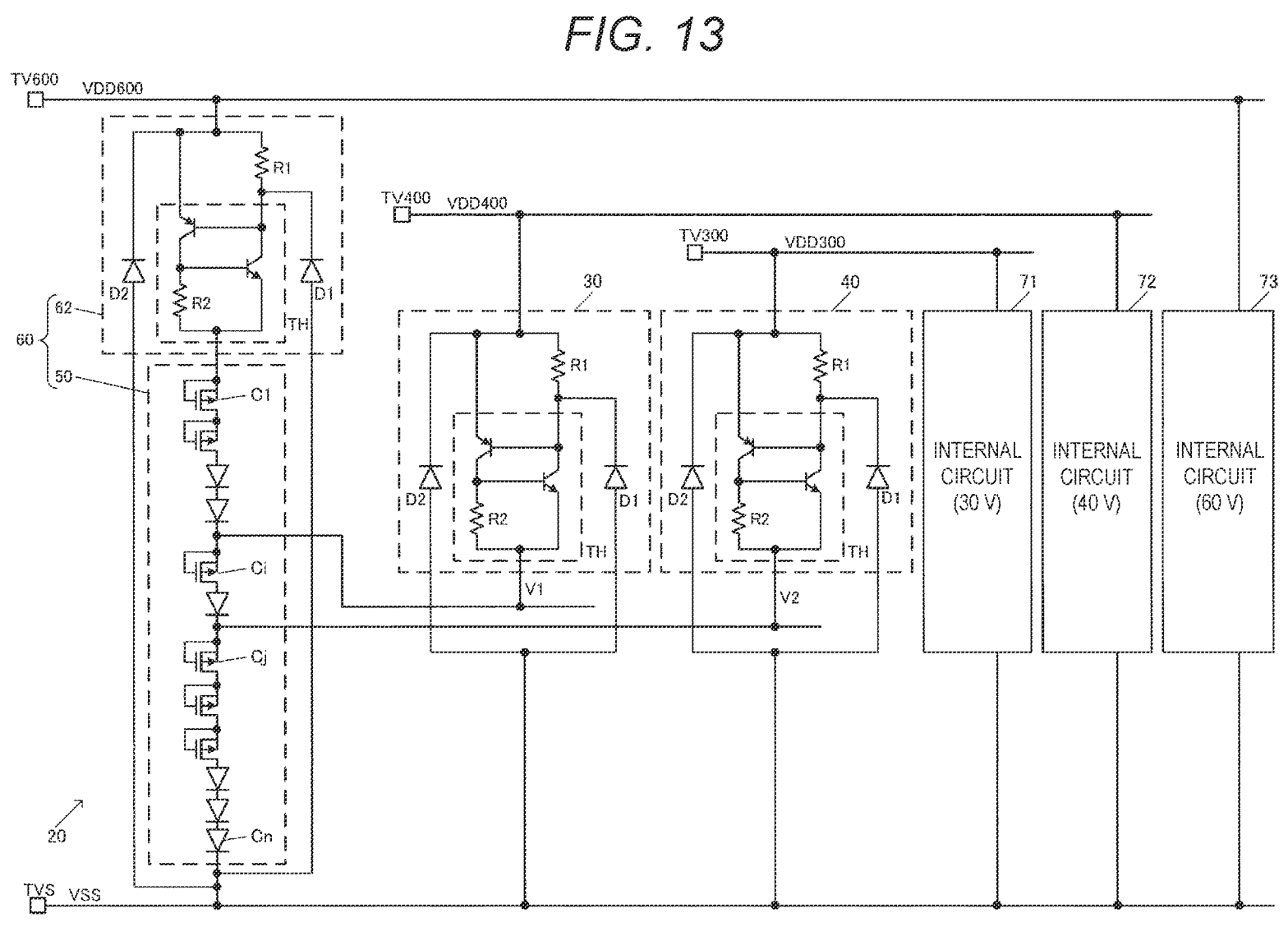

FIG. 13 shows the sixth configuration example of the circuit device 20 according to the present embodiment. In the sixth configuration example, PMOS transistors each of which a gate and a source are coupled and diodes are mixed as voltage clamping elements constituting the voltage setting circuit 50, and the other circuit configurations are the same as those of the fifth configuration example shown in FIG. 12.

FIG. 13 shows a case in which n=12, i=5, and j=7, and in the voltage setting circuit 50, 12 voltage clamping elements in which the PMOS transistors and the diodes are mixed are coupled in series. The anode of the i-th voltage clamping element Ci=C5 that is a PMOS transistor and that is a fifth voltage clamping element from a high potential side is coupled to the other end of the first thyristor circuit 30. The anode of the j-th voltage clamping element Cj=C7 that is a diode and that is a seventh voltage clamping element from the high potential side is coupled to the other end of the second thyristor circuit 40.

For example, in FIG. 13, a hold voltage of each of the thyristors TH of the first thyristor circuit 30 and the second thyristor circuit 40 is set to Vh(TH)=1.2 V, a hold voltage of each PMOS transistor constituting the voltage setting circuit 50 is set to Vh(PMOS)=9 V, and a hold voltage of each diode is set to Vh(D). Thus, hold voltages Vh(TV600), Vh(TV400), and Vh(TV300) at the power supply terminals TV600, TV400, and TV300 are shown in the following equations, respectively.

$$Vh(TV600)=Vh(TH)+Vh(PMOS)\times6+Vh(D)\times6=61.2\ V$$

$$Vh(TV400)=Vh(TH)+Vh(PMOS)\times4+Vh(D)\times4=41.2\ V$$

$$Vh(TV300)=Vh(TH)+Vh(PMOS)\times3+Vh(D)\times3=31.2\ V$$

Therefore, even a system in which the power supply terminals TV600, TV400, and TV300 are directly coupled to high voltage external power supplies such as 60 V, 40 V, and 30 V, respectively, it is possible to prevent the first thyristor circuit 30, the second thyristor circuit 40, and the third thyristor circuit 62 that are turned on due to noise or the like from being kept on and falling into a state in which a current continues to flow.

Compared with the fifth configuration example shown in FIG. 12, in the sixth configuration example shown in FIG. 13, total hold voltages Vh(TV600), Vh(TV400), and Vh(TV300) at the power supply terminals can be set to lower voltages. That is, in the fifth configuration example shown in FIG. 12, Vh(TV600)=64.2 V, Vh=46.2 V, Vh(TV300)=37.2 V, whereas in the sixth configuration example shown in FIG. 13, Vh(TV600)=61.2 V, Vh(TV400)= 41.2 V, Vh(TV300)=31.2 V. Therefore, a margin can be increased and static electricity resistance can be improved in the sixth configuration in FIG. 13 with respect to a voltage in which transistors used in the internal circuits 71, 72, and 73 of the circuit device 20 are broken.

As described above, in the sixth configuration example of the present embodiment, by using two or more kinds of voltage clamping elements as the voltage clamping elements constituting the voltage setting circuit 50 and combining two or more kinds of hold voltages, it is possible to improve the electrostatic resistance while preventing an increase in an area occupied by the voltage setting circuit 50 in the circuit device 20.

7. Seventh Configuration Example

Figure 14:
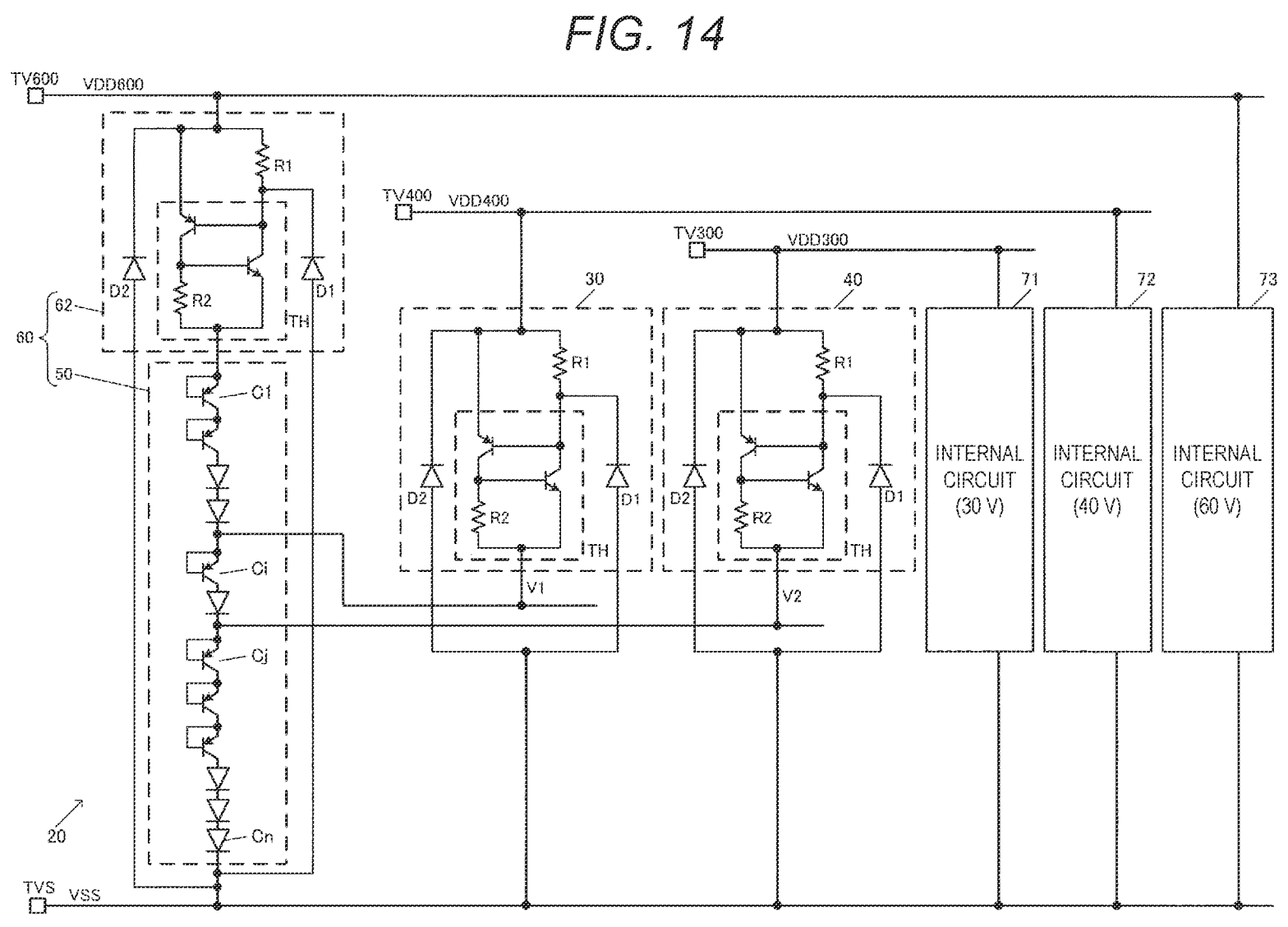

FIG. 14 shows a seventh configuration example of the circuit device 20 according to the present embodiment. In the seventh configuration example, pnp bipolar transistors and diodes are mixed as voltage clamping elements constituting the voltage setting circuit 50, and other circuit configurations are the same as those of the fifth configuration example shown in FIG. 12. That is, in the seventh configuration example shown in FIG. 14, the pnp bipolar transistors are used instead of the PMOS transistors used in the sixth configuration example shown in FIG. 13. In each pnp bipolar transistor, a base and an emitter are coupled.

In a case in which the PMOS transistors are used as the voltage clamping elements of the voltage setting circuit 50, when a surge current due to static electricity flows, an overvoltage is applied between a gate and a drain of the PMOS transistor, and a risk of breakage exists. In this respect, by using the pnp bipolar transistors as the voltage clamping elements as in the seventh configuration example shown in FIG. 14, there is an advantage that no risk of breakage of the gate exists because the bipolar transistor has no gate.

As described above, in the present embodiment, as shown in FIG. 14, at least one of the first voltage clamping element C1 to the n-th voltage clamping element Cn of the voltage setting circuit 50 is the pnp bipolar transistor in which the base and the emitter are coupled. When a current flows due to breakdown of the pnp bipolar transistor that is turned off by coupling the base and the emitter, a hold voltage is generated between the emitter and a collector. This pnp bipolar transistor has an advantage that less risk of breakage exists when a surge current flows, as compared with the PMOS transistor. Therefore, it is possible to achieve the voltage setting circuit 50 that is not easily broken by the surge current while preventing an increase in an area occupied by the voltage setting circuit 50 in the circuit device 20.

8. Eighth Configuration Example

Figure 15:
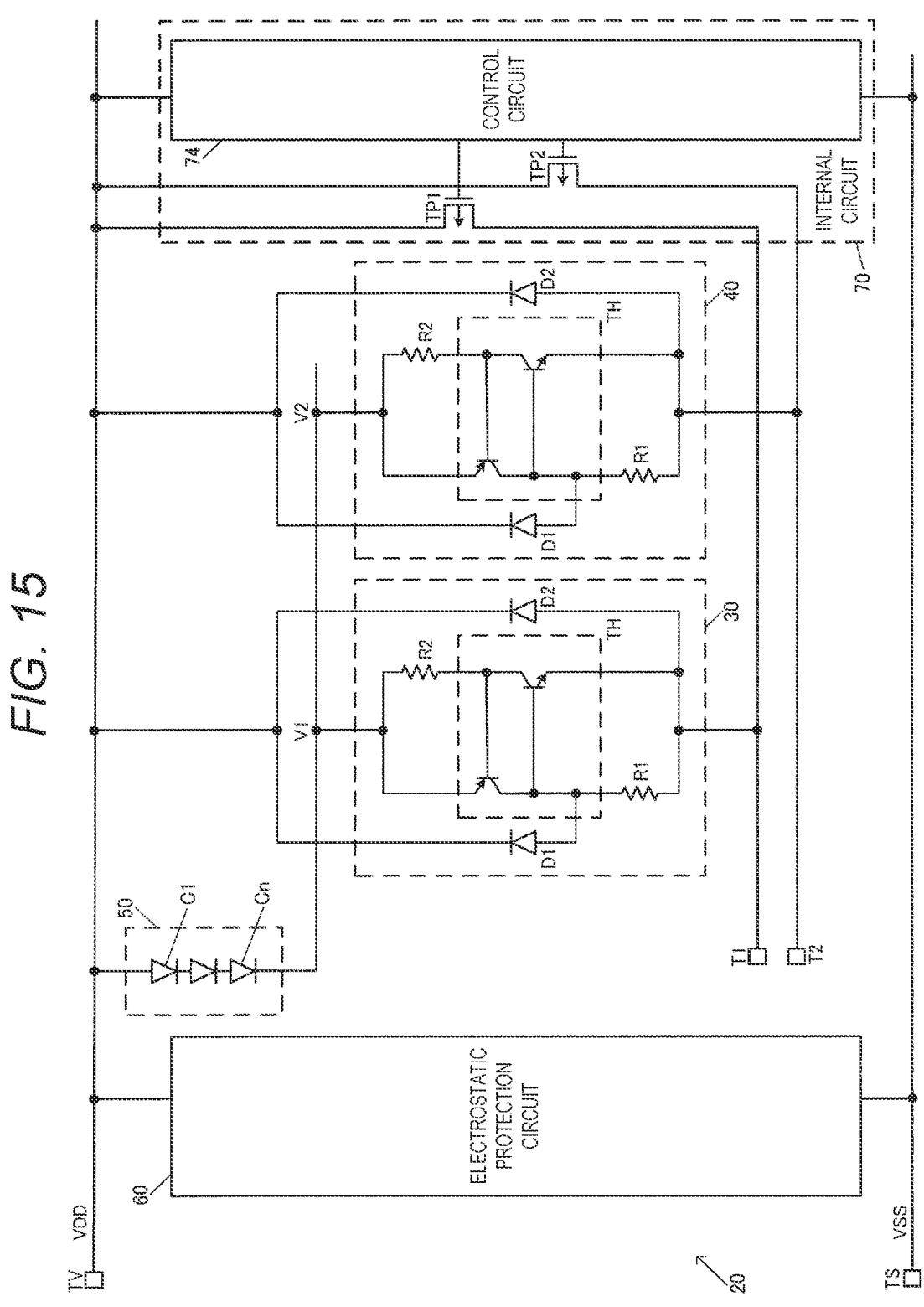
FIG. 15 is an eighth configuration example of the circuit device according to the present embodiment.
Figure 16:
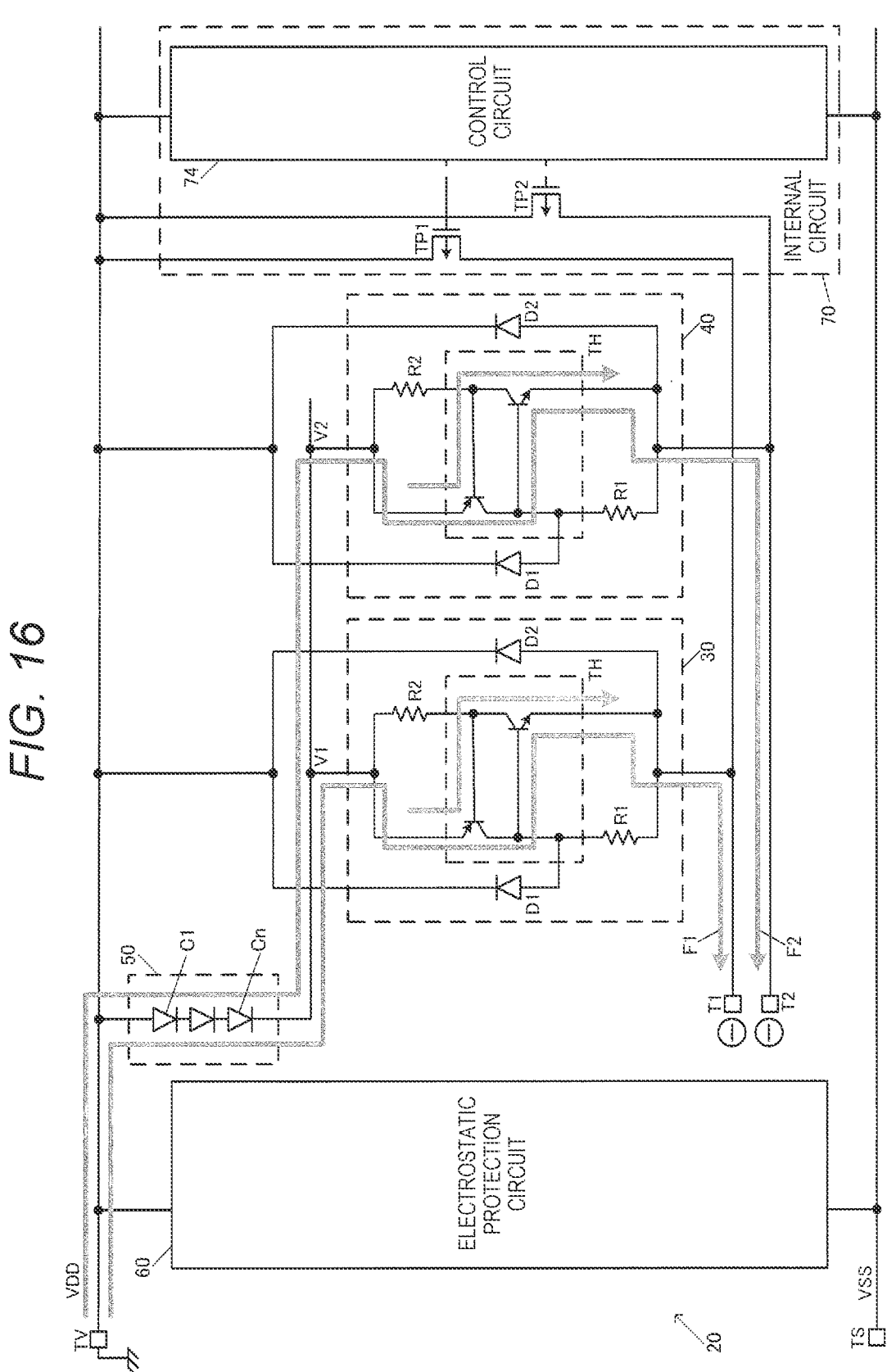
FIG. 16 is a diagram illustrating a discharge path in the eighth configuration example.

FIG. 15 shows an eighth configuration example of the circuit device 20 according to the present embodiment. F1 and F2 in FIG. 16 show discharge paths when static electricity having a positive polarity is applied to the first terminal T1 and the second terminal T2 with VDD=GND in the eighth configuration example.

In the first configuration example to the seventh configuration example, a case has been described in which the electrostatic protection circuit including the first thyristor circuit 30, the second thyristor circuit 40, and the like is provided between the first terminal T1, the second terminal T2, and the like and the power supply terminal TS of VSS which is the low potential-side power supply. In contrast, in the eighth configuration example shown in FIG. 15, an electrostatic protection circuit including the first thyristor circuit 30 and the second thyristor circuit 40 is provided between the first terminal T1, the second terminal T2, and the power supply terminal TV of VDD which is the high potential-side power supply. In particular, as shown in FIG. 15, the eighth configuration example in FIG. 15 is effective when the internal circuit 70 includes PMOS open-drain transistors TP1 and TP2 whose gates are controlled by a control circuit 74, and the first terminal T1 and the second terminal T2 are coupled to the drains of the transistors TP1 and TP2. The first terminal T1 and the second terminal T2 to which the PMOS open-drain transistors TP1 and TP2 are coupled are terminals having a function of preventing a current from flowing from a power supply to the first terminal T1 and the second terminal T2 even when a potential lower than that of VSS is applied from the outside. As an electrostatic protection circuit of the first terminal T1 and the second terminal T2 having such a function, the first

OK 17
18 thyristor circuit 30, the second thyristor circuit 40, and the voltage setting circuit 50 having a coupling configuration as shown in FIG. 15 are used.

Specifically, in FIG. 15, one end of the first thyristor circuit 30 is a cathode, and the first terminal T1 is coupled to the cathode which is one end of the first thyristor circuit 30. The other end of the first thyristor circuit 30 is an anode, and the shared voltage setting circuit 50 is coupled to the anode which is the other end of the first thyristor circuit 30. One end of the second thyristor circuit 40 is a cathode, and the second terminal T2 is coupled to the cathode which is one end of the second thyristor circuit 40. The other end of the second thyristor circuit 40 is an anode, and the shared voltage setting circuit 50 is coupled to the anode which is the other end of the second thyristor circuit 40.

For example, in FIG. 15, a hold voltage of each of the thyristors TH of the first thyristor circuit 30 and the second thyristor circuit 40 is set to Vh(TH)=1.2 V, and a hold voltage of each of the voltage clamping elements C1 to Cn constituting the voltage setting circuit 50 is set to Vh(C)=1 V. Vh(C) is a hold voltage Vh(D) of a diode which is the voltage clamping element. Thus, total hold voltages Vh(T1) and Vh(T2) at the first terminal T1 and the second terminal T2 are shown in the following equation.

$$Vh(T1)=Vh(T2)=Vh(TH)+Vh(C)\times3=4.2 \text{ V}$$

Therefore, in a system or the like in which VDD−3.3 V, which is an external power supply, is directly coupled to both the first terminal T1 and the second terminal T2, it is possible to prevent the first thyristor circuit 30 and the second thyristor circuit 40 that are turned on due to noise or the like from being kept on and falling into a state in which a current continues to flow. Here, the external power supply VDD−3.3 V is a power supply that is lower than VDD by 3.3 V as a reference. In the eighth configuration example shown in FIG. 15, since the voltage setting circuit 50 shared by the first thyristor circuit 30 for the first terminal T1 and the second thyristor circuit 40 for the second terminal T2 is used, an increase in an area occupied by the voltage setting circuit 50 in the circuit device 20 can be prevented.

In FIG. 15, the other end of the first thyristor circuit 30 and the other end of the second thyristor circuit 40 are coupled to a cathode of the n-th voltage clamping element Cn of the first voltage clamping element C1 to the n-th voltage clamping element Cn constituting the voltage setting circuit 50. That is, the anodes, which are the other ends of the first thyristor circuit 30 and the second thyristor circuit 40, are coupled to the cathode of the n-th voltage clamping element Cn. In this manner, when the hold voltages of the first voltage clamping element C1 to the n-th voltage clamping element Cn are set to Vh(C1) to Vh(Cn), the first voltage V1 at the other end of the first thyristor circuit 30 and the second voltage V2 at the other end of the second thyristor circuit 40 can be set to V1=V2=VDD−{Vh(C1)+Vh(C2)+ . . . +Vh(Cn)}. Accordingly, a problem that a current continues to flow through the first thyristor circuit 30 and the second thyristor circuit 40 can be prevented.

In the present embodiment, the anode of the first voltage clamping element C1 is coupled to a node of VDD which is a high potential-side power supply. In this manner, when the first thyristor circuit 30 or the second thyristor circuit 40 is turned on, a current flows from the node of VDD to the first thyristor circuit 30 or the second thyristor circuit 40 via the first voltage clamping element C1 to the n-th voltage clamping element Cn of the voltage setting circuit 50. Accordingly, when static electricity having a negative polarity is applied to the first terminal T1 or the second terminal T2, for example, a current flows from the node of VDD to the first terminal T1 or the second terminal T2 via the voltage setting circuit 50, the first thyristor circuit 30, or the second thyristor circuit 40, and the internal circuit 70 can be protected from the static electricity.

9. Ninth Configuration Example

Figure 17:
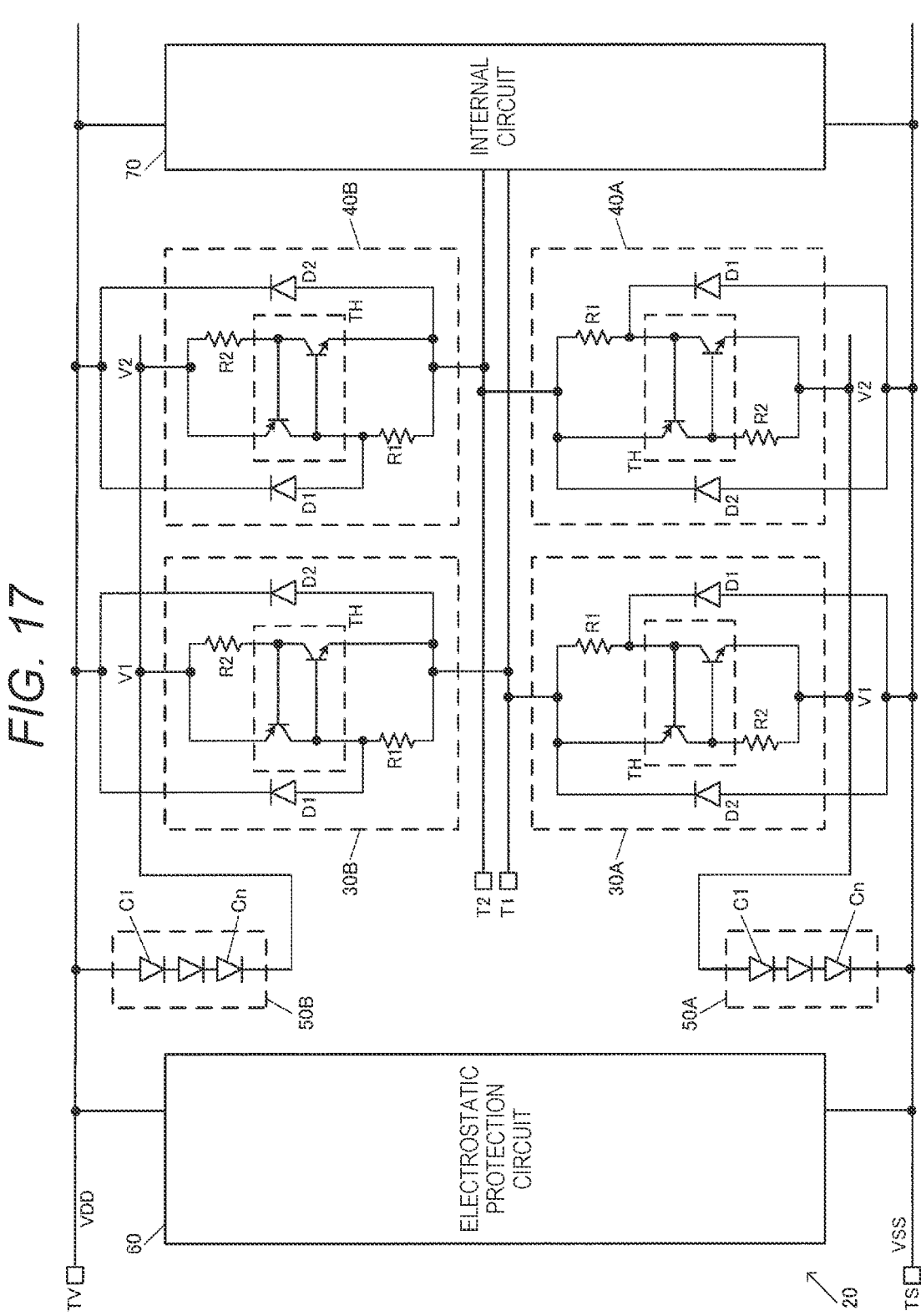
FIG. 17 is a ninth configuration example of the circuit device according to the present embodiment.

FIG. 17 shows a ninth configuration example of the circuit device 20 according to the present embodiment. In the ninth configuration example shown in FIG. 17, an electrostatic protection circuit including a first thyristor circuit 30A and a second thyristor circuit 40A is provided between the first terminal T1, the second terminal T2 and the power supply terminal TS of VSS which is a low potential-side power supply, and an electrostatic protection circuit including a first thyristor circuit 30B and a second thyristor circuit 40B is provided between the first terminal T1 and the second terminal T2 and the power supply terminal TV of VDD which is a high potential-side power supply.

According to such a configuration, since one voltage setting circuit may be provided on each of a VDD side and a VSS side, such as a voltage setting circuit 50A on the VDD side and a voltage setting circuit 50B on the VSS side, an increase in an area occupied by the voltage setting circuits in the circuit device 20 can be prevented.

In the ninth configuration example shown in FIG. 17, the diode D2 in each thyristor circuit may not be provided. This is because, for example, when static electricity having a positive polarity is applied to the first terminal T1 or the second terminal T2 with VDD=GND, a current flows from the first terminal T1 or the second terminal T2 to the VSS side via the first thyristor circuit 30A or the second thyristor circuit 40A, and the current flows to the VDD side via the electrostatic protection circuit 60 between the power supplies.

10. Tenth Configuration Example

Figure 18:
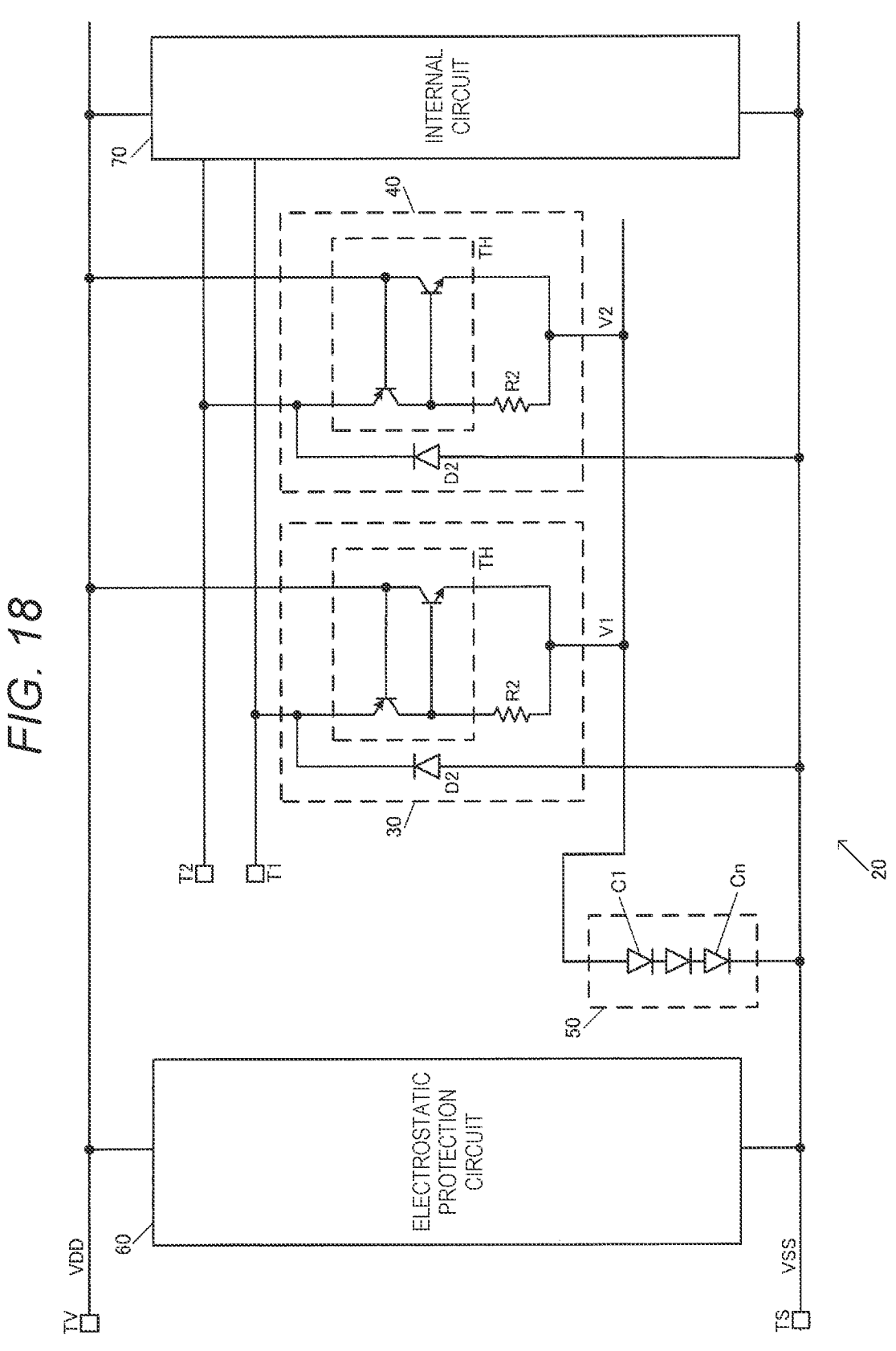
FIG. 18 is a tenth configuration example of the circuit device according to the present embodiment.
Figure 19:
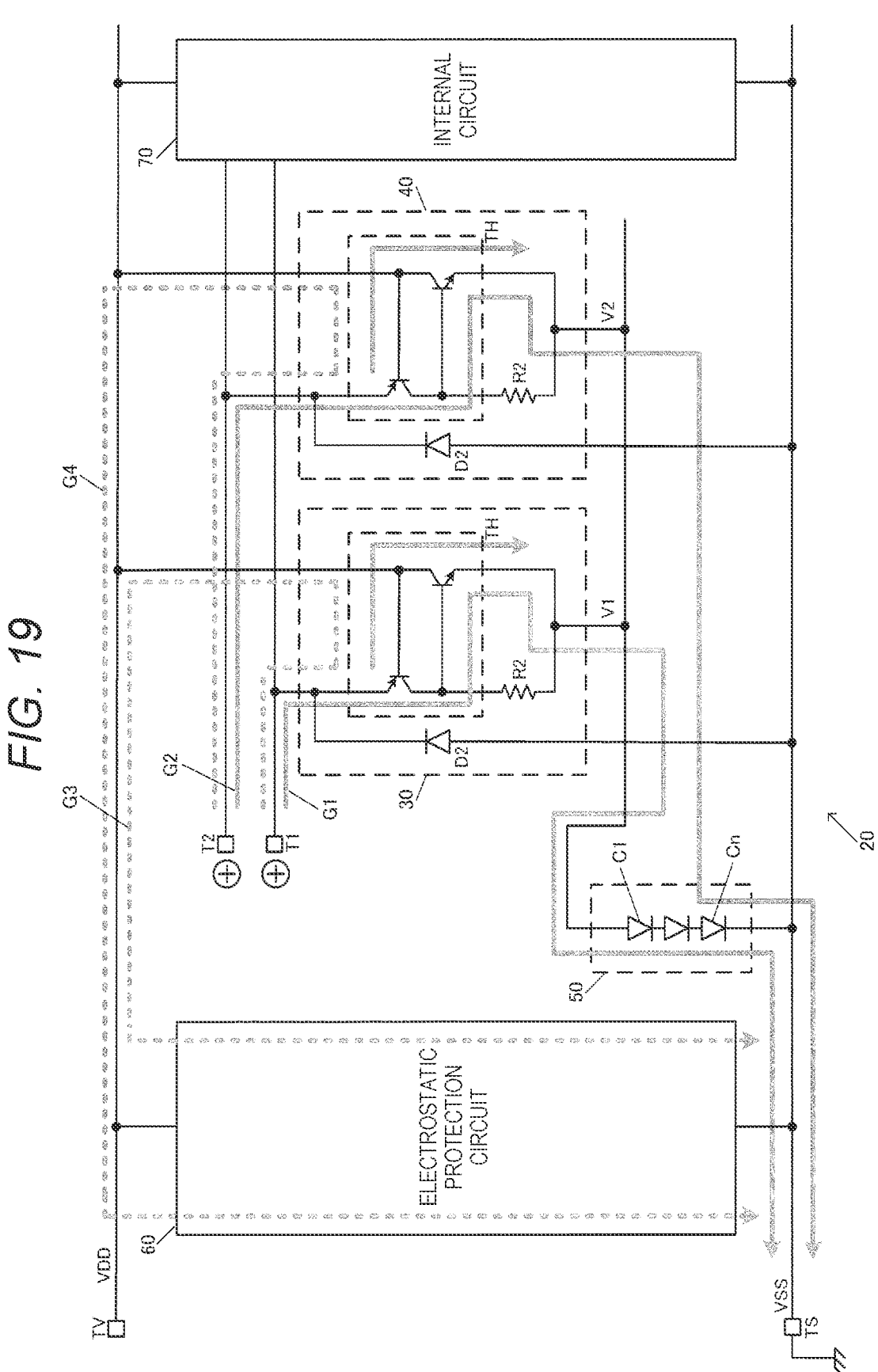
FIG. 19 is a diagram illustrating a discharge path in the tenth configuration example.

FIG. 18 shows a tenth configuration example of the circuit device 20 according to the present embodiment. G1, G2, G3, and G4 in FIG. 19 show discharge paths when static electricity having a positive polarity is applied to the first terminal T1 and the second terminal T2 with VSS=GND in the tenth configuration example.

In the first configuration example to the ninth configuration example, the gate of each of the thyristor circuits of the first thyristor circuit 30 and the second thyristor circuit 40 is coupled to the diode D1 serving as a trigger circuit. In contrast, in the tenth configuration example shown in FIG. 18, the gate of each thyristor circuit is coupled to the power supply terminal TV of VDD.

In this manner, in the present embodiment, the gate of the first thyristor circuit 30 and the gate of the second thyristor circuit 40 may be coupled to the power supply terminal TV. In FIG. 1, a gate of the thyristor circuit 28 is, for example, the base of the bipolar transistor Q1 constituting the thyristor TH. In FIG. 1, a cathode of the Zener diode D1 serving as a trigger circuit is coupled to the gate of the thyristor circuit 28, and when static electricity is applied to the terminal T, the Zener diode D1 breaks down and a current flows as indicated by A1, so that the base current of the bipolar transistor Q1 flows and the bipolar transistor Q1 is turned on.

In contrast, in FIG. 18, the gates of the first thyristor circuit 30 and the second thyristor circuit 40 are coupled to the power supply terminal TV of VDD. Accordingly, when static electricity is applied to the first terminal T1, as indicated by G3 in FIG. 19, an operation in which a current flows through the electrostatic protection circuit 60 between the power supplies acts as a trigger, the first thyristor circuit 30 is turned on, and as indicated by G1, a surge current due to the static electricity flows to a power supply terminal TS side of VSS via the first thyristor circuit 30 and the voltage setting circuit 50. When the static electricity is applied to the second terminal T2, as indicated by G4 in FIG. 19, an operation in which a current flows through the electrostatic protection circuit 60 between the power supplies acts as a trigger, the second thyristor circuit 40 is turned on, and as indicated by G2, a surge current due to the static electricity flows to the power supply terminal TS side of VSS via the second thyristor circuit 40 and the voltage setting circuit 50. Accordingly, the internal circuit 70 coupled between the first terminal T1, the second terminal T2, and the power supply terminal TS of VSS can be protected from the static electricity.

In this manner, in the tenth configuration example, even when the trigger circuit is different from those of the first to ninth configuration examples, the internal circuit 70 can be protected from the static electricity by the voltage setting circuit 50 shared by the first thyristor circuit 30 and the second thyristor circuit 40, and an increase in an area occupied by the voltage setting circuit 50 in the circuit device 20 can be prevented by sharing the voltage setting circuit 50. Further, since it is not necessary to provide the diode D1 serving as a trigger circuit in each thyristor circuit, an area of each thyristor circuit can be reduced.

11. Eleventh Configuration Example

Figure 20:
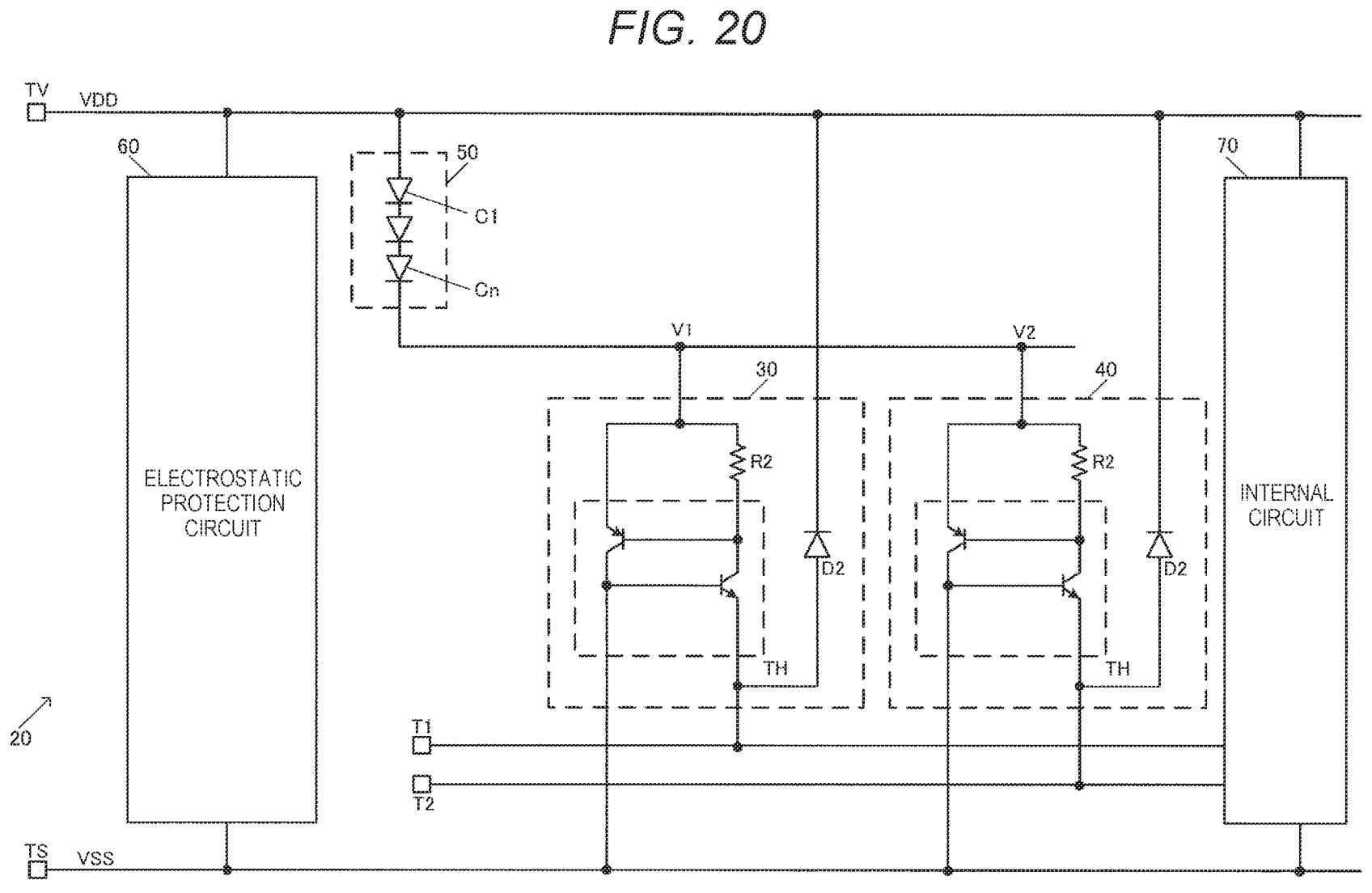

FIG. 20 shows an eleventh configuration example of the circuit device 20 according to the present embodiment. G1, G2, G3, and G4 in FIG. 21 show discharge paths when static electricity having a negative polarity is applied to the first terminal T1 and the second terminal T2 with VDD=GND in the eleventh configuration example.

In the tenth configuration example shown in FIG. 18, the gates of the first thyristor circuit 30 and the second thyristor circuit 40 are coupled to the power supply terminal TV of VDD which is a high potential-side power supply. In contrast, in the eleventh configuration example shown in FIG. 20, the gates of the first thyristor circuit 30 and the second thyristor circuit 40 are coupled to the power supply terminal TS of VSS which is a low potential-side power supply. In FIG. 20, the base of the bipolar transistor Q2 constituting the thyristor TH shown in FIG. 1 corresponds to the gates of the first thyristor circuit 30 and the second thyristor circuit 40.

Figure 21:
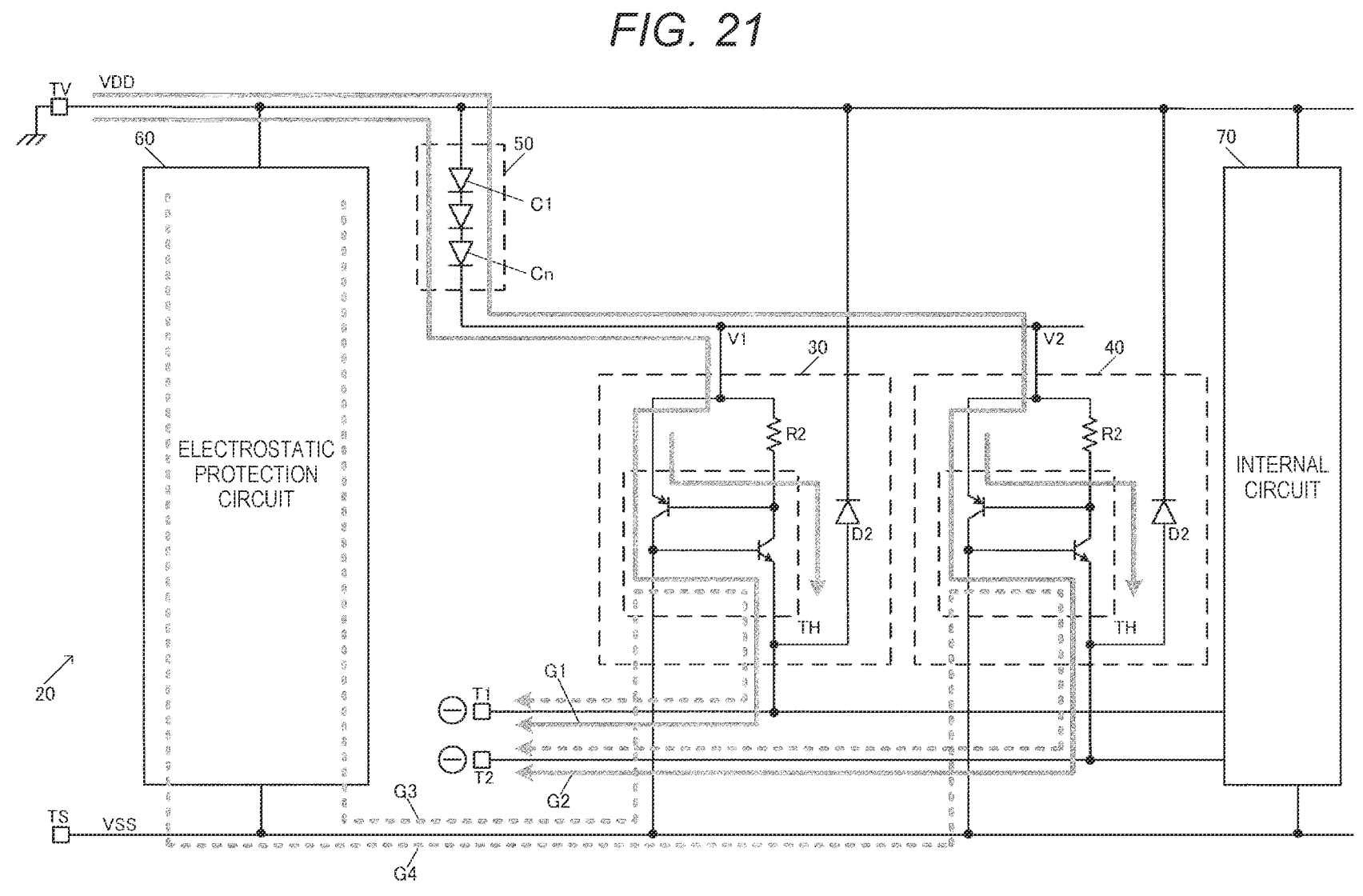

Accordingly, when static electricity having a negative polarity is applied to the first terminal T1 or the second terminal T2, as indicated by G3 and G4 in FIG. 21, an operation in which a current flows through the electrostatic protection circuit 60 between the power supplies acts as a trigger, the first thyristor circuit 30 or the second thyristor circuit 40 is turned on. As indicated by G1 and G2, a surge current due to the static electricity flows from the power supply terminal TV of VDD to the first terminal T1 side or the second terminal T2 side via the first thyristor circuit 30, the second thyristor circuit 40, and the voltage setting circuit 50. Accordingly, the internal circuit 70 coupled between the first terminal T1, the second terminal T2, and the power supply terminal TV of VDD can be protected from the static electricity.

In this manner, in the eleventh configuration example, even when the trigger circuit is different from those of the first to ninth configuration examples, the internal circuit 70 can be protected from the static electricity, and an increase in an area occupied by the voltage setting circuit 50 in the circuit device 20 can be prevented by sharing the voltage setting circuit 50. Further, since it is not necessary to provide the diode D1 serving as a trigger circuit in each thyristor circuit, an area of each thyristor circuit can be reduced.

12. Twelfth Configuration Example

Figure 22:
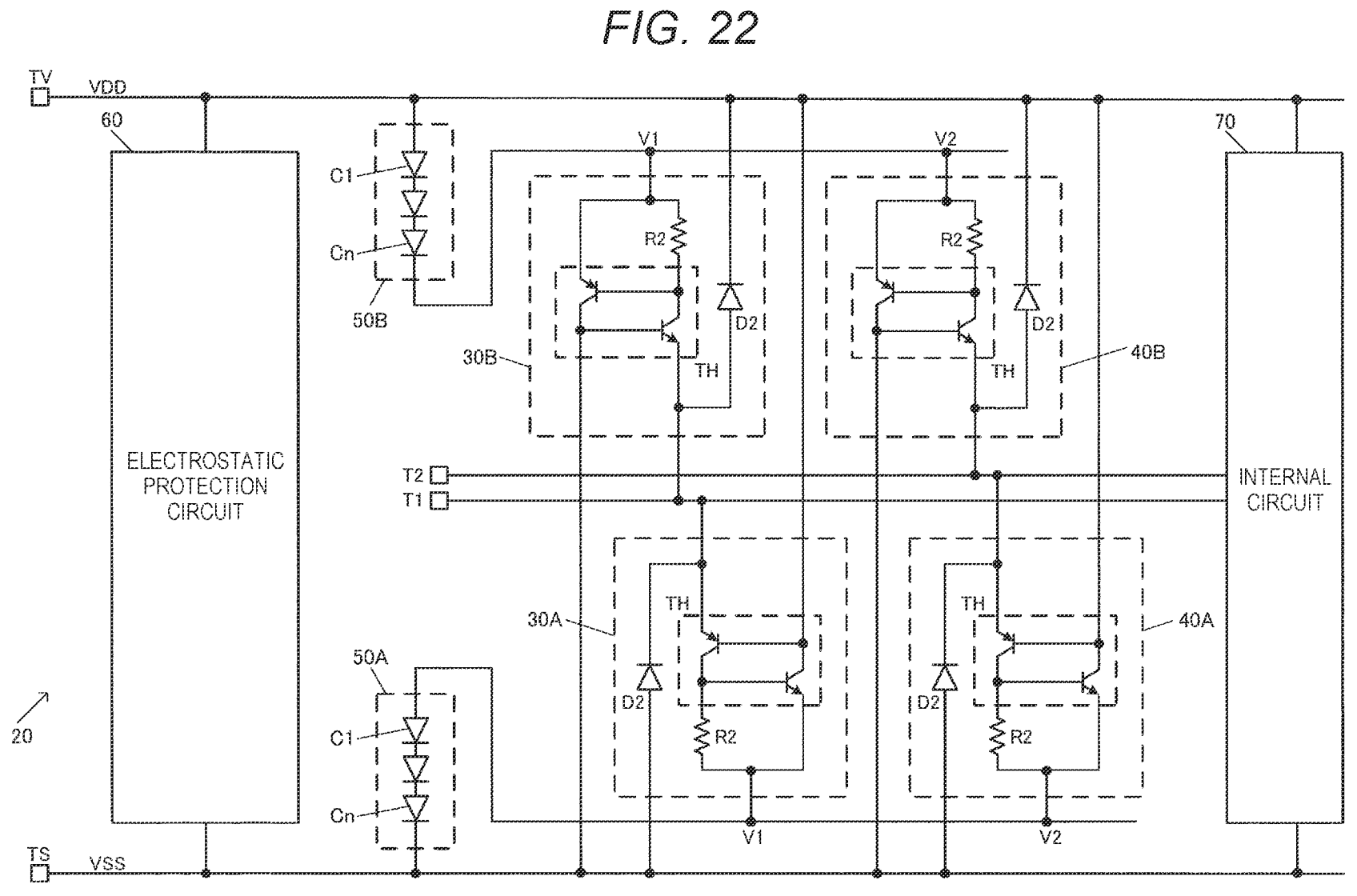

FIG. 22 shows a twelfth configuration example of the circuit device 20 according to the present embodiment. In the twelfth configuration example shown in FIG. 22, as in the ninth configuration example shown in FIG. 17, an electrostatic protection circuit including the first thyristor circuit 30A and the second thyristor circuit 40A is provided between the first terminal T2, the second terminal T2 and the power supply terminal TS of VSS, and an electrostatic protection circuit including the first thyristor circuit 30B and the second thyristor circuit 40B is provided between the first terminal T1 and the second terminal T2 and the power supply terminal TV of VDD. In the twelfth configuration example shown in FIG. 22, as in the tenth configuration example shown in FIG. 18 and the eleventh configuration example shown in FIG. 20, the gates of first thyristor circuit 30A and the second thyristor circuit 40A are coupled to the power supply terminal TV of VDD, and the gates of the first thyristor circuit 30B and the second thyristor circuit 40B are coupled to the power supply terminal TS of VSS. Also in the twelfth configuration example shown in FIG. 22, the diode D2 in each thyristor circuit may not be provided. This is because, for example, when static electricity having a positive polarity is applied to the first terminal T1 or the second terminal T2 with VDD=GND, a current flows from the first terminal T1 or the second terminal T2 to the VSS side via the first thyristor circuit 30A or the second thyristor circuit 40A, and the current flows to the VDD side via the electrostatic protection circuit 60 between the power supplies.

Also in the twelfth configuration example shown in FIG. 22, since one voltage setting circuit may be provided on each of the VDD side and the VSS side, such as the voltage setting circuit 50A on the VDD side and the voltage setting circuit 50B on the VSS side, an increase in an area occupied by the voltage setting circuits in the circuit device 20 can be prevented.

13. Layout Arrangement

Figure 23:
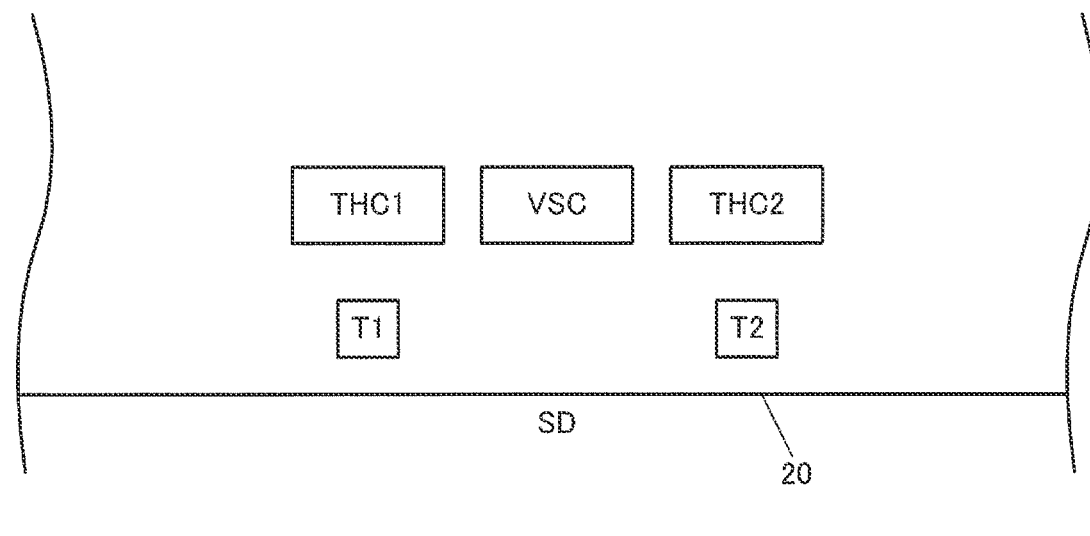
FIG. 23 is a layout arrangement example of the circuit device according to the present embodiment.
Figure 23:
Figure 24:
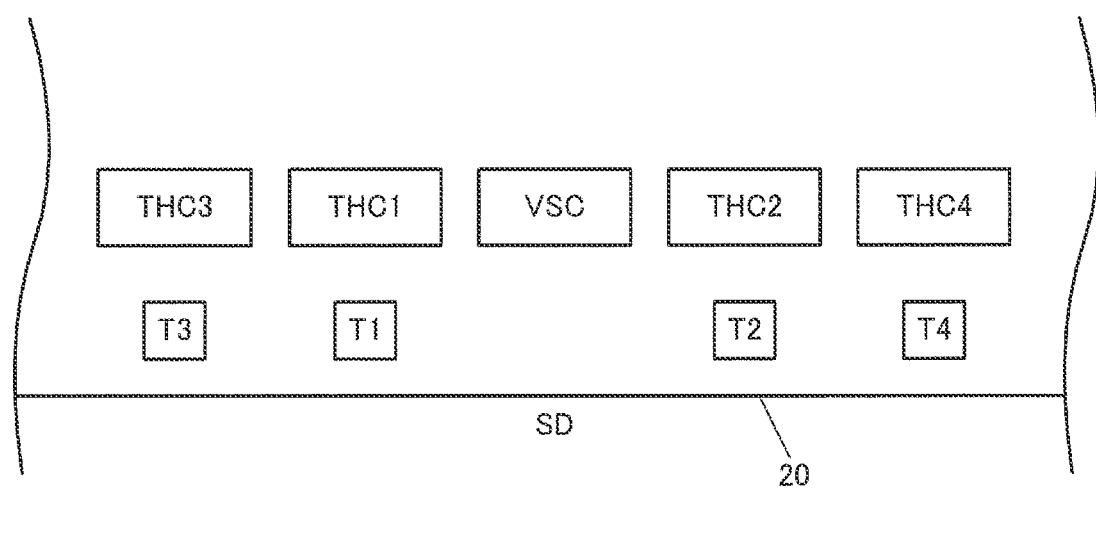
FIG. 24 is a layout arrangement example of the circuit device according to the present embodiment.
Figure 24:
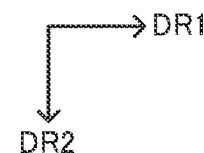

FIGS. 23 and 24 show layout arrangement examples of the circuit device 20 according to the present embodiment. FIGS. 23 and 24 are layout arrangement examples in a plan view in a direction orthogonal to a substrate of a semiconductor of the circuit device 20 which is a semiconductor chip. A first direction DR1 of FIGS. 23 and 24 is a direction along a side SD of the circuit device 20 which is a semiconductor chip, and a second direction DR2 is a direction orthogonal to the first direction DR1. The first direction DR1 and the second direction DR2 are directions along the plane of the substrate of the circuit device 20.

In FIG. 23, a voltage setting circuit VSC is disposed between a first thyristor circuit THC1 and a second thyristor circuit THC2 in a plan view in a direction orthogonal to the substrate of the circuit device 20. For example, in FIG. 23, the voltage setting circuit VSC is disposed at a first direction DR1 side of the first thyristor circuit THC1, and the second thyristor circuit THC2 is disposed at the first direction DR1 side of the voltage setting circuit VSC. For example, the first terminal T1 is disposed at a second direction DR2 side of the first thyristor circuit THC1, and the second terminal T2 is disposed at the second direction DR2 side of the second thyristor circuit THC2. The first thyristor circuit THC1, the second thyristor circuit THC2, and the voltage setting circuit VSC correspond to the first thyristor circuit 30, the second thyristor circuit 40, and the voltage setting circuit 50 described in the first to twelfth configuration examples, and the voltage setting circuit VSC is shared by the first thyristor circuit THC1 and the second thyristor circuit THC2. According to such a layout arrangement, the first thyristor circuit THC1 and the second thyristor circuit THC2 sharing the voltage setting circuit VSC can be disposed near the voltage setting circuit VSC. Therefore, a length of a wiring coupling the first thyristor circuit THC1 and the voltage setting circuit VSC, or a wiring coupling the second thyristor circuit THC2 and the voltage setting circuit VSC can be shortened, and the parasitic resistance of the wiring can be reduced. Therefore, a decrease in electrostatic protection performance due to the parasitic resistance of the wiring can be reduced.

Also in FIG. 24, the voltage setting circuit VSC is disposed between the first thyristor circuit THC1 and the second thyristor circuit THC2 in the plan view in the direction orthogonal to the substrate of the circuit device 20. In FIG. 24, a third thyristor circuit THC3 and a fourth thyristor circuit THC4, a third terminal T3 coupled to the third thyristor circuit THC3, and a fourth terminal T4 coupled to the fourth thyristor circuit THC4 are also provided. The first thyristor circuit THC1 is disposed between the third thyristor circuit THC3 and the voltage setting circuit VSC, and the second thyristor circuit THC2 is disposed between the voltage setting circuit VSC and the fourth thyristor circuit THC4. For example, the third thyristor circuit THC3, the first thyristor circuit THC1, the voltage setting circuit VSC, the second thyristor circuit THC2, and the fourth thyristor circuit THC4 are disposed side by side in this order along the side SD of the circuit device 20. For example, the first terminal T1, the second terminal T2, the third terminal T3, and the fourth terminal T4 are disposed at the second direction DR2 side of the first thyristor circuit THC1, the second thyristor circuit THC2, the third thyristor circuit THC3, and the fourth thyristor circuit THC4, respectively. The voltage setting circuit VSC is shared by the first thyristor circuit THC1, the second thyristor circuit THC2, the third thyristor circuit THC3, and the fourth thyristor circuit THC4. In this manner, the number of thyristor circuits sharing the voltage setting circuit VSC is not limited to two, and the voltage setting circuit VSC can be shared by three or more thyristor circuits.

As described above, a circuit device according to the present embodiment includes a first terminal, a second terminal, a first thyristor circuit whose one end is coupled to the first terminal, and a second thyristor circuit whose one end is coupled to the second terminal. The circuit device includes a voltage setting circuit that is shared by the first thyristor circuit and the second thyristor circuit and through which a current from the first thyristor circuit when the first thyristor circuit is turned on and a current from the second thyristor circuit when the second thyristor circuit is turned on flow. The voltage setting circuit sets a voltage at the other end of the first thyristor circuit to a first voltage when the first thyristor circuit is turned on, and sets a voltage at the other end of the second thyristor circuit to a second voltage when the second thyristor circuit is turned on.

According to the present embodiment, the voltage setting circuit is shared by the first thyristor circuit whose one end is coupled to the first terminal and the second thyristor circuit whose one end is coupled to the second terminal. The shared voltage setting circuit sets the voltage at the other end of the first thyristor circuit to the first voltage when the first thyristor circuit is turned on, and sets the voltage at the other end of the second thyristor circuit to the second voltage when the second thyristor circuit is turned on. In this manner, when the voltage setting circuit sets the voltage at the other end of the first thyristor circuit to the first voltage and sets the voltage at the other end of the second thyristor circuit to the second voltage, a total hold voltage at the first terminal and a total hold voltage at the second terminal can be increased. Therefore, even when each thyristor circuit of the first thyristor circuit or the second thyristor circuit is turned on, it is possible to prevent each thyristor circuit from being kept on and falling into a state in which a current continues to flow. Since the voltage setting circuit is shared by the first thyristor circuit coupled to the first terminal and the second thyristor circuit coupled to the second terminal, the circuit device can be reduced in size as compared with a case in which the voltage setting circuit is provided for each terminal. Therefore, it is possible to realize both prevention of the problem that the current continues to flow through each thyristor circuit and a reduction in the circuit area.

In the present embodiment, the first voltage and the second voltage may be the same voltage.

In this manner, a hold voltage at the first terminal set by the first thyristor circuit and the voltage setting circuit and a hold voltage at the second terminal set by the second thyristor circuit and the voltage setting circuit can be set to the same voltage.

In the present embodiment, the first voltage and the second voltage may be different voltages.

In this manner, the hold voltage at the first terminal set by the first thyristor circuit and the voltage setting circuit and the hold voltage at the second terminal set by the second thyristor circuit and the voltage setting circuit can be set to different voltages.

In the present embodiment, the voltage setting circuit may include a first voltage clamping element to an n-th voltage clamping element coupled in series, n being an integer of 2 or more.

In this manner, by configuring the voltage setting circuit with the first voltage clamping element to the n-th voltage clamping element coupled in series, the voltage at the other end of the first thyristor circuit can be set to the first voltage or the voltage at the other end of the second thyristor circuit can be set to the second voltage using a clamping voltage generated by a current flowing through one or a plurality of voltage clamping elements.

In the present embodiment, the other end of the first thyristor circuit and the other end of the second thyristor circuit may be coupled to an anode of the first voltage clamping element.

In this manner, hold voltages of the first voltage clamping element to the n-th voltage clamping element can be set to a voltage corresponding to a sum of hold voltages of the plurality of voltage clamping elements.

In the present embodiment, the other end of the first thyristor circuit is coupled to an anode of an i-th voltage clamping element, the other end of the second thyristor circuit is coupled to an anode of a j-th voltage clamping element, i and j being integers satisfying $1 \leq i < j \leq n$.

In this manner, the first voltage set at the other end of the first thyristor circuit by the voltage setting circuit and the second voltage set at the other end of the second thyristor circuit by the voltage setting circuit can be set to different voltages.

In the present embodiment, a cathode of the n-th voltage clamping element may be coupled to a low potential-side power supply node.

In this manner, a current from the other end of the first thyristor circuit or the second thyristor circuit that is turned on flows from the cathode of the n-th voltage clamping element to the low potential-side power supply node through one or more voltage clamping elements of the first voltage clamping element to the n-th voltage clamping element of the voltage setting circuit.

In the present embodiment, the other end of the first thyristor circuit and the other end of the second thyristor circuit may be coupled to the cathode of the n-th voltage clamping element.

In this manner, the hold voltages of the first voltage clamping element to the n-th voltage clamping element can be set to a voltage corresponding to a sum of hold voltages of the plurality of voltage clamping elements.

In the present embodiment, the anode of the first voltage clamping element is coupled to a high potential-side power supply node.

In this manner, when the first thyristor circuit or the second thyristor circuit is turned on, a current flows from the high potential-side power supply node to the first thyristor circuit or the second thyristor circuit via the first voltage clamping element to the n-th voltage clamping element of the voltage setting circuit.

In the present embodiment, at least one of the first voltage clamping element to the n-th voltage clamping element may be a diode.

In this manner, a hold voltage is generated by the voltage setting circuit using a forwarding voltage of the diode, the voltage at the other end of the first thyristor circuit can be set to the first voltage or the voltage at the other end of the second thyristor circuit can be set to the second voltage.

In the present embodiment, at least one of the first voltage clamping element to the n-th voltage clamping element may be a PMOS transistor in which a source and a gate are coupled.

In this manner, by using the PMOS transistor in which the source and the gate are coupled as the voltage clamping element, a hold voltage having a higher voltage can be generated as compared with the case in which the diode is used as the voltage clamping element.

In the present embodiment, at least one of the first voltage clamping element to the n-th voltage clamping element may be a pnp bipolar transistor in which a base and an emitter are coupled.

In this manner, it is possible to generate a hold voltage by the voltage setting circuit while reducing a risk of breakage when a surge current flows.

In the present embodiment, an electrostatic protection circuit between power supplies that is provided between a high potential-side power supply node and a low potential-side power supply node and that includes a third thyristor circuit is included. The voltage setting circuit may be a voltage setting circuit provided in the electrostatic protection circuit and coupled to the third thyristor circuit.

In this manner, the voltage setting circuit of the electrostatic protection circuit between power supplies can be effectively used as a voltage setting circuit shared by the first thyristor circuit and the second thyristor circuit.

In the present embodiment, a gate of the first thyristor circuit and a gate of the second thyristor circuit may be coupled to a power supply terminal.

In this manner, even when a trigger circuit coupled to the gate of each of the first thyristor circuit and the second thyristor circuit is not provided, each of the thyristor circuits can be turned on by using the electrostatic protection circuit between power supplies or the like.

In the present embodiment, $Vmax1 < V1 + Vh(TH)$, $Vmax2 < V2 + Vh(TH)$, in which a hold voltage of a thyristor TH of each of the first thyristor circuit and the second thyristor circuit is set to $Vh(TH)$, the first voltage is set to $V1$, the second voltage is set to $V2$, a maximum operating voltage of the first terminal is set to $Vmax1$, and a maximum operating voltage of the second terminal is set to $Vmax2$ may be satisfied.

In a case in which the relationship is satisfied, when the first thyristor circuit and the second thyristor circuit are turned on due to noise or the like, it is possible to prevent a state in which a current continues to flow through the first thyristor circuit and the second thyristor circuit.

In the present embodiment, the voltage setting circuit is disposed between the first thyristor circuit and the second thyristor circuit in a plan view in a direction orthogonal to a substrate of the circuit device.

In this manner, a length of a wiring coupling the first thyristor circuit and the voltage setting circuit, or a wiring coupling the second thyristor circuit and the voltage setting circuit can be shortened, and performance degradation of electrostatic protection caused by parasitic resistance of the wiring can be reduced.

Although the present embodiment has been described in detail above, it will be easily understood by those skilled in the art that many modifications can be made without substantially departing from the novel matters and effects of the present disclosure. Therefore, all such modifications are intended to be included within the scope of the present disclosure. A configuration in which at least two configuration examples of a plurality of configuration examples described in the present embodiment are combined is also included within the scope of the present disclosure. For example, a term cited with a different term having a broader meaning or the same meaning at least once in the specification or in the drawings can be replaced with the different term in any place in the specification or in the drawings. All combinations of the present embodiment and the modifications are also included in the scope of the present disclosure. The configurations, operations, and the like of the circuit device are not limited to those described in the present embodiment, and various modifications can be made.

What is claimed is:

1. A circuit device comprising:
a first terminal;
a second terminal;
a first thyristor circuit whose one end is coupled to the first terminal;
a second thyristor circuit whose one end is coupled to the second terminal; and
a voltage setting circuit that is shared by the first thyristor circuit and the second thyristor circuit and through which a current from the first thyristor circuit when the first thyristor circuit is turned on and a current from the second thyristor circuit when the second thyristor circuit is turned on flow, wherein
the voltage setting circuit sets a voltage at an other end of the first thyristor circuit to a first voltage when the first thyristor circuit is turned on, and sets a voltage at an other end of the second thyristor circuit to a second voltage when the second thyristor circuit is turned on, wherein the voltage setting circuit is directly coupled to a trigger circuit coupled to a gate of the first thyristor circuit and a trigger circuit coupled to a gate of the second thyristor circuit, the voltage setting circuit includes a first voltage clamping element to an n-th voltage clamping element coupled in series, wherein n is an integer of 2 or more, an anode of the first voltage clamping element is coupled to a high potential-side power supply node.

2. The circuit device according to claim 1, wherein the first voltage and the second voltage are the same voltage.

3. The circuit device according to claim 1, wherein the first voltage and the second voltage are different voltages.

4. The circuit device according to claim 1, wherein the other end of the first thyristor circuit and the other end of the second thyristor circuit are coupled to the anode of the first voltage clamping element.

5. The circuit device according to claim 4, wherein a cathode of the n-th voltage clamping element is coupled to a low potential-side power supply node.

6. The circuit device according to claim 1, wherein the other end of the first thyristor circuit is coupled to an anode of an i-th voltage clamping element, the other end of the second thyristor circuit is coupled to an anode of a j-th voltage clamping element, i and j being integers satisfying $1 \leq i < j \leq n$.

7. The circuit device according to claim 1, wherein the other end of the first thyristor circuit and the other end of the second thyristor circuit are coupled to a cathode of the n-th voltage clamping element.

8. The circuit device according to claim 1, wherein at least one of the first voltage clamping element to the n-th voltage clamping element is a diode.

9. The circuit device according to claim 1, wherein at least one of the first voltage clamping element to the n-th voltage clamping element is a PMOS transistor in which a source and a gate are coupled.

10. The circuit device according to claim 1, wherein at least one of the first voltage clamping element to the n-th voltage clamping element is a pnp bipolar transistor in which a base and an emitter are coupled.

11. The circuit device according to claim 1, further comprising:

an electrostatic protection circuit between power supplies that is provided between a high potential-side power supply node and a low potential-side power supply node and that includes a third thyristor circuit, wherein the voltage setting circuit is a voltage setting circuit that is provided in the electrostatic protection circuit and that is coupled to the third thyristor circuit.

12. The circuit device according to claim 1, wherein a gate of the first thyristor circuit and a gate of the second thyristor circuit are coupled to a power supply terminal.

13. The circuit device according to claim 1, wherein $$Vmax1 < V1 + Vh(TH),$$

$$Vmax2 < V2 + Vh(TH),$$

wherein a hold voltage of a thyristor TH of each of the first thyristor circuit and the second thyristor circuit is set to Vh(TH), the first voltage is set to V1, the second voltage is set to V2, a maximum operating voltage of the first terminal is set to Vmax1, and a maximum operating voltage of the second terminal is set to Vmax2.

14. A circuit device comprising:
a first terminal;
a second terminal;
a first thyristor circuit whose one end is coupled to the first terminal;
a second thyristor circuit whose one end is coupled to the second terminal; and
a voltage setting circuit that is shared by the first thyristor circuit and the second thyristor circuit and through which a current from the first thyristor circuit when the first thyristor circuit is turned on and a current from the second thyristor circuit when the second thyristor circuit is turned on flow, wherein
the voltage setting circuit sets a voltage at an other end of the first thyristor circuit to a first voltage when the first thyristor circuit is turned on, and sets a voltage at an other end of the second thyristor circuit to a second voltage when the second thyristor circuit is turned on,
the voltage setting circuit includes a first voltage clamping element to an n-th voltage clamping element coupled in series, n being an integer of 2 or more,
the other end of the first thyristor circuit and the other end of the second thyristor circuit are coupled to a cathode of the n-th voltage clamping element, and
an anode of the first voltage clamping element is coupled to a high potential-side power supply node.

15. A circuit device comprising:
a first terminal;
a second terminal;
a first thyristor circuit whose one end is coupled to the first terminal;
a second thyristor circuit whose one end is coupled to the second terminal; and
a voltage setting circuit that is shared by the first thyristor circuit and the second thyristor circuit and through which a current from the first thyristor circuit when the first thyristor circuit is turned on and a current from the second thyristor circuit when the second thyristor circuit is turned on flow, wherein
the voltage setting circuit sets a voltage at an other end of the first thyristor circuit to a first voltage when the first thyristor circuit is turned on, and sets a voltage at an other end of the second thyristor circuit to a second voltage when the second thyristor circuit is turned on, and
the voltage setting circuit is disposed between the first thyristor circuit and the second thyristor circuit in a plan view in a direction orthogonal to a substrate of the circuit device.

* * * * *